United States Patent
Kamo et al.

(10) Patent No.: US 10,862,122 B2
(45) Date of Patent: Dec. 8, 2020

(54) NEGATIVE ELECTRODE ACTIVE MATERIAL, MIXED NEGATIVE ELECTRODE ACTIVE MATERIAL, METHOD FOR PRODUCING NEGATIVE ELECTRODE ACTIVE MATERIAL

(71) Applicant: SHIN-ETSU CHEMICAL CO., LTD., Tokyo (JP)

(72) Inventors: Hiromichi Kamo, Takasaki (JP); Takakazu Hirose, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 117 days.

(21) Appl. No.: 16/092,645

(22) PCT Filed: Feb. 22, 2017

(86) PCT No.: PCT/JP2017/006680
§ 371 (c)(1),
(2) Date: Oct. 10, 2018

(87) PCT Pub. No.: WO2017/183286
PCT Pub. Date: Oct. 26, 2017

(65) Prior Publication Data
US 2019/0148728 A1    May 16, 2019

(30) Foreign Application Priority Data
Apr. 18, 2016 (JP) ................. 2016-082590

(51) Int. Cl.
*H01M 4/134* (2010.01)
*H01M 4/58* (2010.01)
(Continued)

(52) U.S. Cl.
CPC ......... *H01M 4/5825* (2013.01); *C01B 33/113* (2013.01); *C01B 33/32* (2013.01);
(Continued)

(58) Field of Classification Search
CPC ...... H01M 4/5825; H01M 4/485; H01M 4/60; H01M 4/48; H01M 4/36; H01M 4/366;
(Continued)

(56) References Cited

U.S. PATENT DOCUMENTS

| 5,395,711 A | 3/1995 | Tahara et al. |
| 7,459,236 B2 | 12/2008 | Konishiike et al. |

(Continued)

FOREIGN PATENT DOCUMENTS

| CN | 103943827 | * | 7/2014 | ......... H01M 4/1397 |
| JP | 2997741 B2 | | 1/2000 | |

(Continued)

OTHER PUBLICATIONS

Machine translation of CN 103943827, retrieved from www.espacenet.com on Sep. 14, 2020.*

(Continued)

*Primary Examiner* — Cynthia K Walls
(74) *Attorney, Agent, or Firm* — Oliff PLC

(57) ABSTRACT

A negative electrode active material which is a negative electrode active material containing particles of a negative electrode active material, wherein the particles of the negative electrode active material contain particles of a silicon compound which contain a silicon compound ($SiO_x$: $0.5 \le x \le 1.6$), the particles of the negative electrode active material contain lithium, and the particles of the negative electrode active material have a peak in the range of $2\theta=31.8\pm0.5°$ measured by X-ray diffraction spectrum using $K\alpha$ line of Cu. According to this constitution, it is provided a negative electrode active material capable of improving cycle characteristics and initial charge and discharge characteristics when it is used as a negative electrode active material of a lithium ion secondary battery.

17 Claims, 2 Drawing Sheets

(51) Int. Cl.
  *C01B 33/32* (2006.01)
  *H01M 4/587* (2010.01)
  *C01B 33/113* (2006.01)
  *H01M 4/485* (2010.01)
  *H01M 4/60* (2006.01)
  *H01M 4/48* (2010.01)
  *H01M 4/36* (2006.01)
  *H01M 4/62* (2006.01)
  *H01M 4/02* (2006.01)

(52) U.S. Cl.
  CPC .............. *H01M 4/36* (2013.01); *H01M 4/366* (2013.01); *H01M 4/48* (2013.01); *H01M 4/485* (2013.01); *H01M 4/587* (2013.01); *H01M 4/60* (2013.01); *H01M 4/622* (2013.01); *C01P 2002/60* (2013.01); *C01P 2002/72* (2013.01); *C01P 2002/86* (2013.01); *C01P 2004/61* (2013.01); *C01P 2006/40* (2013.01); *H01M 2004/021* (2013.01); *H01M 2004/027* (2013.01)

(58) Field of Classification Search
  CPC ................ H01M 4/622; H01M 4/587; H01M 2004/021; H01M 2004/027; H01M 10/052; H01M 4/483; H01M 4/625; H01M 4/131; H01M 4/0447; H01M 4/0459; H01M 4/1391; H01M 4/1393; H01M 4/364; H01M 4/62; H01M 10/446; C01B 33/113; C01B 33/32; Y02E 60/10; C01P 2002/74; C01P 2002/60; C01P 2002/72; C01P 2002/86; C01P 2004/61; C01P 2006/40
  See application file for complete search history.

(56) References Cited

U.S. PATENT DOCUMENTS

| 8,377,592 | B2 | 2/2013 | Jeong et al. |
| 2005/0118083 | A1 | 6/2005 | Tabuchi |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2015/0287989 | A1 | 10/2015 | Hirose et al. |
| 2016/0254525 | A1 | 9/2016 | Hirose et al. |
| 2016/0336592 | A1 | 11/2016 | Hirose et al. |
| 2016/0351947 | A1 | 12/2016 | Kamo et al. |
| 2017/0207450 | A1 | 7/2017 | Takahashi et al. |
| 2017/0288216 | A1 | 10/2017 | Kamo et al. |

FOREIGN PATENT DOCUMENTS

| JP | 2001-185127 A | 7/2001 |
| JP | 2002-042806 A | 2/2002 |
| JP | 2005-108826 A | 4/2005 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2013-114820 A | 6/2013 |
| JP | 2015-149224 A | 8/2015 |
| JP | 2015-153520 A | 8/2015 |
| WO | 2015063979 A1 | 5/2015 |
| WO | 2015118593 A1 | 8/2015 |
| WO | 2016/009590 A1 | 1/2016 |
| WO | 2016/056155 A1 | 4/2016 |

OTHER PUBLICATIONS

Nov. 26, 2019 Search Report issued in European Patent Application No. 17785631.7.
Oct. 23, 2018 International Preliminary Report on Patentability issued in International Patent Application No. PCT/JP2017/006680.
Apr. 2, 2019 Office Action issued in Japanese Patent Application No. 2016-082590.
Apr. 18, 2017 Search Report issued in International Patent Application No. PCT/JP2017/006680.
Oct. 8, 2019 Office Action issued in Japanese Patent Application No. 2016-082590.
Jul. 2, 2020 Office Action issued in Taiwanese Patent Application No. 106107534.

* cited by examiner

[FIG. 1]
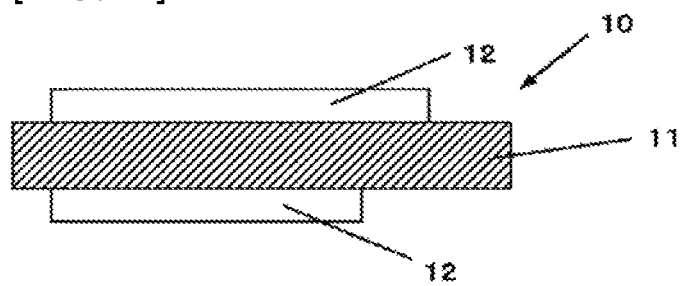
[FIG. 2]
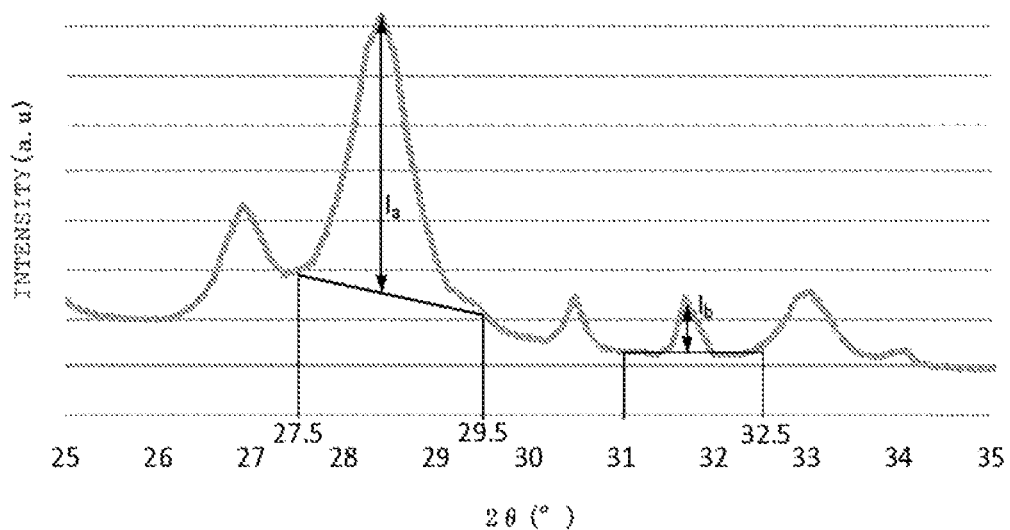
[FIG. 3]
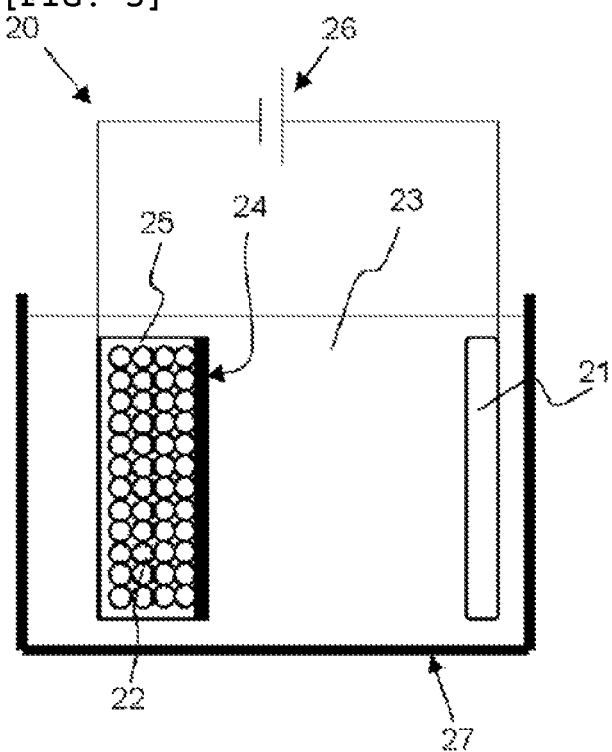

[FIG. 4]
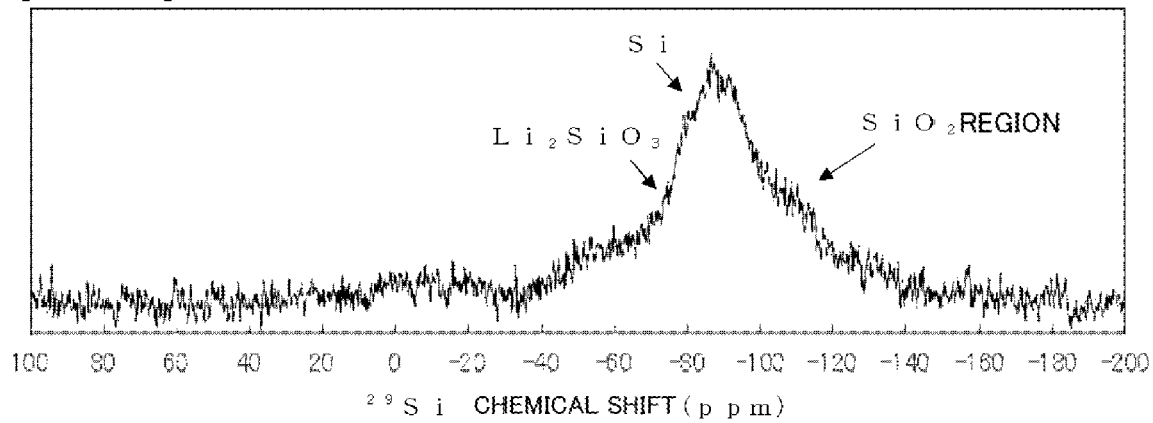
[FIG. 5]
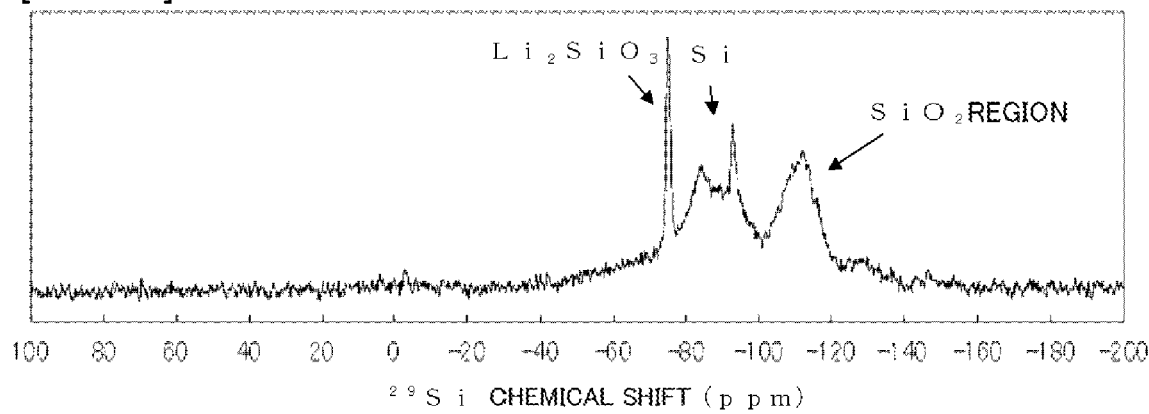
[FIG. 6]
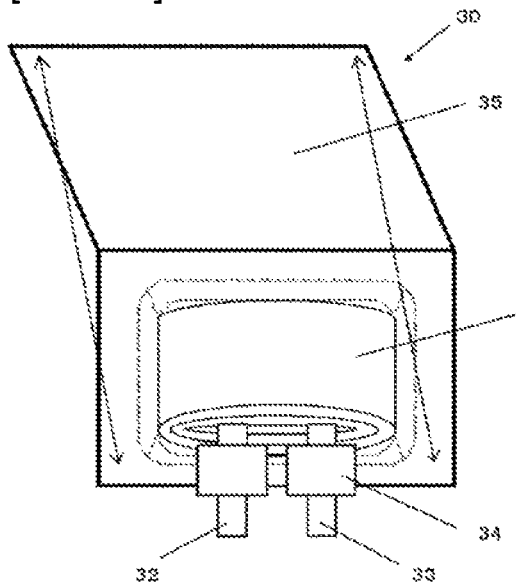

ary layer of silicon oxide particles (for example, see
NEGATIVE ELECTRODE ACTIVE MATERIAL, MIXED NEGATIVE ELECTRODE ACTIVE MATERIAL, METHOD FOR PRODUCING NEGATIVE ELECTRODE ACTIVE MATERIAL

TECHNICAL FIELD

The present invention relates to a negative electrode active material, a mixed negative electrode active material, and a method for producing the negative electrode active material.

BACKGROUND ART

In recent years, small electronic devices represented by mobile terminals and the like have been widely spread, and further miniaturization, weight reduction and prolongation of life are strongly required. In response to such market demands, development of secondary batteries that are particularly compact, lightweight and capable of obtaining high energy density has been progressed. This secondary battery has been also investigated to apply, not limited only to small sized electronic devices, to large sized electronic devices represented by an automobile and the like, and power storage system represented by houses and the like.

Among these, a lithium ion secondary battery is markedly expected since it is easy to make compact and high capacity, and can obtain high energy density than those of lead batteries and nickel cadmium batteries.

The lithium ion secondary battery has an electrolytic solution together with a positive electrode, a negative electrode and a separator, and the negative electrode contains a negative electrode active material which participates in a charge and discharge reaction.

As the negative electrode active material, a carbon-based active material has widely been used, and on the other hand, further improvement in battery capacity has been required from recent market demands. In order to improve the battery capacity, it has been investigated to use silicon as a negative electrode active material. This is because theoretical capacity of silicon (4,199 mAh/g) is not less than 10 times larger than the theoretical capacity of graphite (372 mAh/g), so that significant improvement in battery capacity can be expected. Development of a silicon material as a material of the negative electrode active material has been investigated not only a silicon simple substance but also a compound represented by an alloy or an oxide and the like. Also, the shape of the active material has been widely investigated from a coating type which is a standard in the carbon-based active material to an integrated type which is directly deposited on a current collector.

However, when silicon is used as a main raw material of the negative electrode active material, the negative electrode active material expands and shrinks at the time of charge and discharge, so that it is likely to break mainly in the vicinity of the surface layer of the negative electrode active material. In addition, an ionic substance is generated inside the active material, and the negative electrode active material becomes a substance which is easily broken. If the surface layer of the negative electrode active material is broken, a new surface is generated thereby, so that the reaction area of the active material increases. At this time, a decomposition reaction of the electrolytic solution occurs on the new surface, and a coating film which is a decomposed product of the electrolytic solution is formed on the new surface, so that the electrolytic solution is consumed. Therefore, the cycle characteristics tend to be likely lowered.

Various investigations have been made until now on negative electrode materials for lithium ion secondary batteries including a silicon material as a main component and electrode constitution in order to improve initial battery efficiency and cycle characteristics.

Specifically, for the purpose of obtaining good cycle characteristics and high safety, silicon and amorphous silicon dioxide are simultaneously deposited by a gas phase method (for example, see Patent Document 1). In addition, in order to obtain high battery capacity and safety, a carbon material (electron conductive material) is provided on a surface layer of silicon oxide particles (for example, see Patent Document 2). Further, in order to improve cycle characteristics and to obtain high input-output characteristics, an active material containing silicon and oxygen is prepared and an active material layer having a high oxygen ratio is formed in the vicinity of a current collector (for example, see Patent Document 3). Also, in order to improve cycle characteristics, it is so constituted that oxygen is contained in a silicon active material, an average oxygen content is 40 at % or less, and the oxygen content is increased in a place close to a current collector (for example, see Patent Document 4).

Also, in order to improve initial charge and discharge efficiency, a nanocomposite containing a Si phase, $SiO_2$ and $M_yO$ metal oxide is used (for example, see Patent Document 5). Further, in order to improve cycle characteristics, $SiO_x$ ($0.8 \leq x \leq 1.5$, particle size range=1 μm to 50 μm) and a carbon material are mixed and baked at a high temperature (for example, see Patent Document 6). Moreover, in order to improve cycle characteristics, a molar ratio of oxygen to silicon in a negative electrode active material is set to 0.1 to 1.2, and the active material is controlled in the range that the difference between the maximum value and the minimum value of the molar ratio in the vicinity of the active material and a current collector is 0.4 or less (for example, see Patent Document 7). Furthermore, in order to improve battery load characteristics, a metal oxide containing lithium is used (for example, see Patent Document 8). Also, in order to improve cycle characteristics, a hydrophobic layer such as a silane compound is formed on a surface layer of a silicon material (for example, see Patent Document 9). Further, in order to improve cycle characteristics, silicon oxide is used and a graphite coating is formed on the surface layer thereof to impart conductivity (for example, see Patent Document 10). In Patent Document 10, with regard to a shift value obtained from the RAMAN spectrum relating to a graphite coating, broad peaks appear at 1330 $cm^{-1}$ and 1580 $cm^{-1}$, and their intensity ratio $I_{1330}/I_{1580}$ is $1.5<I_{1330}/I_{1580}<3$. Moreover, in order to improve high battery capacity and cycle characteristics, particles having a silicon microcrystalline phase dispersed in silicon dioxide are used (for example, see Patent Document 11). Furthermore, in order to improve overcharge and overdischarge characteristics, silicon oxide whose ratio of atomic number of silicon and oxygen is controlled to 1:y ($0<y<2$) is used (for example, see Patent Document 12).

CITATION LIST

Patent Literature

Patent Document 1: Japanese Patent Laid-Open Publication No. 2001-185127
Patent Document 2: Japanese Patent Laid-Open Publication No. 2002-042806

Patent Document 3: Japanese Patent Laid-Open Publication No. 2006-164954
Patent Document 4: Japanese Patent Laid-Open Publication No. 2006-114454
Patent Document 5: Japanese Patent Laid-Open Publication No. 2009-070825
Patent Document 6: Japanese Patent Laid-Open Publication No. 2008-282819
Patent Document 7: Japanese Patent Laid-Open Publication No. 2008-251369
Patent Document 8: Japanese Patent Laid-Open Publication No. 2008-177346
Patent Document 9: Japanese Patent Laid-Open Publication No. 2007-234255
Patent Document 10: Japanese Patent Laid-Open Publication No. 2009-212074
Patent Document 11: Japanese Patent Laid-Open Publication No. 2009-205950
Patent Document 12: Japanese Patent No. 2,997,741

SUMMARY OF INVENTION

Technical Problem

In recent years, miniaturized mobile devices represented by electronic devices have been improved in high performance and multifunctionalization, and an increase in battery capacity is required for lithium ion secondary batteries, which is the main power source thereof. As one means to solve the problem, development of a lithium ion secondary battery including a negative electrode using a silicon material as a main material has been desired. In addition, the lithium ion secondary battery using the silicon material has been desired to have the cycle characteristics similar to those of a lithium ion secondary battery using a carbon-based active material. However, it has not yet been reached to propose a negative electrode active material having cycle stability equivalent to that of a lithium ion secondary battery using a carbon-based active material.

The present invention was made in view of the situation, and has an object to provide a negative electrode active material capable of improving cycle characteristics and initial charge and discharge characteristics when it is used as a negative electrode active material of a lithium ion secondary battery. The present invention is also to provide a method for producing such a negative electrode active material. The present invention is further to provide a mixed negative electrode active material containing the negative electrode active material.

Solution to Problem

To accomplish the objects, the present invention is to provide a negative electrode active material which is a negative electrode active material containing particles of a negative electrode active material, wherein the particles of the negative electrode active material contain particles of a silicon compound which contain a silicon compound ($SiO_x$: $0.5 \leq x \leq 1.6$), the particles of the negative electrode active material contain lithium, and the particles of the negative electrode active material have a peak in a range of $2\theta = 31.8 \pm 0.5°$ obtained by X-ray diffraction (XRD) spectrum using Kα line of Cu.

Thus, by using a material having a peak at $31.8 \pm 0.5°$ by XRD spectrum using Kα line of Cu as the particles of the negative electrode active material, at the time of producing an aqueous negative electrode slurry (a slurry in which the negative electrode active material is dispersed in an aqueous solvent), elution of the Li compound from the particles of the negative electrode active material can be suppressed, so that the Li component contained in the particles of the negative electrode active material is retained, and it is possible to minimize the damage by elution of an alkali into the aqueous negative electrode slurry. Therefore, when the negative electrode active material containing such particles of the negative electrode active material is used as a negative electrode active material of a lithium ion secondary battery, a battery having high battery capacity, and good cycle characteristics and initial charge and discharge characteristics can be obtained.

At this time, the particles of the negative electrode active material are a material, in the X-ray diffraction spectrum, in which an intensity $I_a$ of a peak deriving from an Si (111) face appeared in a range of $2\theta = 28.2 \pm 0.5°$ and an intensity $I_b$ of a peak appeared in a range of $2\theta = 31.8 \pm 0.5°$ preferably satisfy the relationship of the following formula 1.

$$1.0 \times 10^{-3} < I_b/I_a < 1.0 \times 10^0 \qquad \text{Formula 1)}$$

Such a material can suppress elution of the Li compound into the aqueous negative electrode slurry. Therefore, better cycle characteristics and initial charge and discharge characteristics can be obtained.

Further, the peak appeared in the range of $2\theta = 31.8 \pm 0.5°$ in the X-ray diffraction spectrum using Kα line of Cu is preferably a peak deriving from a (002) face of Zabuyelite which is a crystal phase of lithium carbonate.

By existing the crystallized lithium carbonate having the crystal phase in the particles of the negative electrode active material, elution of an alkali from the bulk of the silicon compound can be more effectively suppressed at the time of producing the aqueous negative electrode slurry, and better cycle characteristics and initial charge and discharge characteristics can be obtained.

The particles of the negative electrode active material contain one or more kinds of a polyphenylene compound and a polycyclic aromatic compound, and it is preferably that the polyphenylene compound is one or more kinds of biphenyl, terphenyl, and a derivative thereof, and the polycyclic aromatic compound one or more kinds of naphthalene, anthracene, phenanthrene, naphthacene, pentacene, pyrene, picene, coronene, chrysene, and a derivative thereof.

By containing such materials in the negative electrode active material, it becomes a negative electrode active material which can obtain better cycle characteristics and initial charge and discharge characteristics.

The particles of the silicon compound preferably contain one or more kinds of $Li_2SiO_3$ and $Li_4SiO_4$.

These lithium silicates are materials in which the $SiO_2$ component portion in the silicon compound, which becomes unstable when lithium is inserted and released at the time of charge and discharge of the battery, has previously been reformed into lithium silicates, so that irreversible capacity generating at the time of charging the battery can be reduced. As a result, it becomes a negative electrode active material capable of obtaining better cycle characteristics and initial charge and discharge characteristics.

It is preferable that the particles of the silicon compound have a half value width ($2\theta$) of a diffraction peak attributable to an Si (111) crystal face obtained by X-ray diffraction spectrum using Cu Kα line of 1.2° or more and have a crystallite size corresponding to the crystal face of 7.5 nm or less.

When the negative electrode active material in which the particles of the silicon compound contained therein have the silicon crystallinity is used as a negative electrode active material of a lithium ion secondary battery, better cycle characteristics and initial charge and discharge characteristics can be obtained.

It is preferable for the negative electrode active material of the present invention that, in the particles of the silicon compound, the maximum peak intensity value A of the Si and Li silicate region given by −60 to −95 ppm as the chemical shift value, and the peak intensity value B of the $SiO_2$ region given by −96 to −150 ppm as the chemical shift value, each obtained from the $^{29}Si$-MAS-NMR spectrum, satisfy the relation A>B.

In the particles of the silicon compound, if the amount of Si and $Li_2SiO_3$ based on the $SiO_2$ component is larger, it becomes a negative electrode active material capable of sufficiently obtaining an improved effect in battery characteristics by insertion of Li.

In addition, a test cell including a negative electrode which contains a mixture of a negative electrode active material and a carbon-based active material, and a counter electrode lithium is produced, and in the test cell, charging and discharging including charging which is to flow an electric current so that lithium is inserted into the negative electrode active material and discharging which is to flow an electric current so that lithium is released from the negative electrode active material are repeated 30 times, when a graph showing a relationship between a differentiated value dQ/dV in which a discharge capacity Q at each charge and discharge is differentiated by a potential V of the negative electrode based on the counter electrode lithium, and the potential V, then, it is preferable that a peak of the potential V of the negative electrode at the time of discharging after the Xth time (1≤X≤30) is in the range of 0.40 V to 0.55 V.

The peak in the V−dQ/dV curve is similar to the peak of the silicon material, and a discharge curve at a higher potential side rises sharply, so that the capacity can be easily exhibited when design of the battery is carried out. In addition, if it is a material in which the peak is exhibited by charge and discharge within 30 times, it becomes a negative electrode active material in which a stable bulk is formed.

The particles of the negative electrode active material preferably have a median diameter of 1.0 μm or more and 15 μm or less.

If the median diameter is 1.0 μm or more, it is possible to suppress increase in irreversible capacity of the battery due to increase in the surface area per mass. On the other hand, by making the median diameter 15 μm or less, particles become difficultly crack so that a new surface hardly comes out.

The particles of the negative electrode active material preferably contain a carbon material at a surface layer portion.

In this way, by containing the carbon material at the surface layer portion of the particles of the negative electrode active material, conductivity is improved.

Also, an average thickness of the carbon material is preferably 10 nm or more and 5,000 nm or less.

If the average thickness of the carbon material is 10 nm or more, conductivity is improved. Also, when the average thickness of the carbon material to be coated is 5,000 nm or less, by using the negative electrode active material containing such particles of the negative electrode active material for the lithium ion secondary battery, particles of the silicon compound can be secured with a sufficient amount, so that lowering in battery capacity can be suppressed.

The present invention is also to provide a mixed negative electrode active material which comprises the negative electrode active material and a carbon-based active material.

Thus, by containing a carbon-based active material together with the negative electrode active material of the present invention (silicon-based negative electrode active material) as a material for forming the layer of the negative electrode active material, conductivity of the layer of the negative electrode active material can be improved, and expansion stress accompanied by charging can be alleviated. In addition, by mixing the silicon-based negative electrode active material with the carbon-based active material, battery capacity can be increased.

Also, to accomplish the objects, the present invention is to provide a method for producing a negative electrode active material which is a method for producing a negative electrode active material containing particles of the negative electrode active material which contain particles of a silicon compound, which comprises producing the particles of the negative electrode active material by producing particles of a silicon compound which contain a silicon compound ($SiO_x$: 0.5≤x≤1.6) and inserting lithium into the particles of the silicon compound, and selecting particles having a peak in a range of 2θ=31.8±0.5° obtained by an X-ray diffraction spectrum using Kα line of Cu from the produced particles of the negative electrode active material, and producing a negative electrode active material by using the selected particles of the negative electrode active material.

By thus selecting the particles of the silicon-based active material and producing a negative electrode active material, a negative electrode active material which gives high capacity and good cycle characteristics and initial charge and discharge characteristics when it is used as a negative electrode active material of a lithium ion secondary battery can be produced.

Advantageous Effects of Invention

The negative electrode active material of the present invention can give high capacity and good cycle characteristics and initial charge and discharge characteristics when it is used as a negative electrode active material of a secondary battery. Also, in a mixed negative electrode active material, a negative electrode, and a lithium ion secondary battery each containing the negative electrode active material, the same effects can be obtained. Further, according to the method for producing the negative electrode active material of the present invention, a negative electrode active material which gives good cycle characteristics and initial charge and discharge characteristics when it is used as a negative electrode active material of a lithium ion secondary battery can be produced.

BRIEF DESCRIPTION OF DRAWINGS

FIG. 1 is a cross-sectional view showing one example of a constitution of a negative electrode for a non-aqueous electrolyte secondary battery containing a negative electrode active material of the present invention;

FIG. 2 is a XRD spectrum shown by particles of the negative electrode active material of the present invention;

FIG. 3 is a reformer in bulk to be used for electrochemically doping lithium when the negative electrode active material of the present invention is produced;

FIG. 4 is one example of $^{29}Si$-MAS-NMR spectrum measured from particles of a silicon compound when reforming is carried out by an oxidation-reduction method;

FIG. 5 is one example of $^{29}$Si-MAS-NMR spectrum measured from particles of a silicon compound when reforming is carried out by a thermal doping method; and FIG. 6 is a drawing showing a constitution example (laminate film type) of a lithium secondary battery containing the negative electrode active material of the present invention.

DESCRIPTION OF EMBODIMENTS

In the following, embodiments of the present invention are explained, but the present invention is not limited by these.

As one of the means to increase the battery capacity of the lithium ion secondary battery, it has been investigated to use a negative electrode using a silicon material as a main material, as a negative electrode of a lithium ion secondary battery. The lithium ion secondary battery using the silicon material has been desired to have initial charge and discharge characteristics and cycle characteristics substantially equivalent to those of the lithium ion secondary battery using a carbon material, but it has not yet been proposed a negative electrode active material showing the equivalent initial charge and discharge characteristics and cycle stability to those of the lithium ion secondary battery using the carbon material.

Thus, the present inventors have intensively studied on a negative electrode active material that can provide good characteristics when it is used as a negative electrode of a lithium ion secondary battery. As a result, they have found that when a negative electrode active material which is a negative electrode active material containing particles of the negative electrode active material, wherein particles of the negative electrode active material contained in the negative electrode active material contain particles of a silicon compound which contain a silicon compound (SiO$_x$: 0.5≤x≤1.6), the particles of the silicon compound contain lithium, and the particles of the negative electrode active material is a negative electrode active material having a peak at 31.8±0.5° by XRD spectrum, good cycle characteristics and initial charge and discharge characteristics can be obtained when the negative electrode active material is used as a negative electrode active material of a lithium ion secondary battery, whereby they have accomplished the present invention.

<Negative Electrode for Non-Aqueous Electrolyte Secondary Battery>

First, the negative electrode for a non-aqueous electrolyte secondary battery is explained. FIG. 1 is a cross-sectional view showing one example of a constitution of the negative electrode for a non-aqueous electrolyte secondary battery (hereinafter referred to as "the negative electrode") containing the negative electrode active material of the present invention.

As shown in FIG. 1, a negative electrode 10 is configured to have a layer 12 of a negative electrode active material on a negative electrode current collector 11. In addition, the layer 12 of a negative electrode active material may be provided on both sides or only one side of the negative electrode current collector 11. Further, as long as the negative electrode active material of the present invention is used, the negative electrode current collector 11 may be omitted.

[Negative Electrode Current Collector]

The negative electrode current collector 11 is an excellent conductive material, and constituted by a material having large mechanical strength. Examples of the conductive material may be mentioned, for example, copper (Cu) and nickel (Ni). The conductive material is preferably a material which does not form an intermetallic compound with lithium (Li).

The negative electrode current collector 11 preferably contains carbon (C) or sulfur (S) in addition to the main element. This is because the physical strength of the negative electrode current collector is improved. In particular, when the negative electrode has a layer of an active material that expands during charging, if the current collector contains the elements, there is an effect of suppressing deformation of the electrode including the current collector. The contents of the contained elements are not particularly limited, and these are preferably above all 100 ppm by mass or less. This is because a higher suppressing effect against the deformation can be obtained.

The surface of the negative electrode current collector 11 may be roughened or may not be roughened. The roughened negative electrode current collector is, for example, a metal foil subjected to electrolytic treatment, embossing treatment, chemical etching treatment or the like. The unroughened negative electrode current collector is, for example, a rolled metal foil or the like.

[Layer of Negative Electrode Active Material]

The layer 12 of the negative electrode active material contains the negative electrode active material of the present invention which is capable of storing and releasing lithium ions, and from the viewpoint of battery design, it may further contain other materials such as a negative electrode binding agent (binder), a conductive additive, and the like. The negative electrode active material contains particles of the negative electrode active material, and the particles of the negative electrode active material contain particles of a silicon compound which contain a silicon compound (SiO$_x$: 0.5≤x≤1.6).

In addition, the layer 12 of the negative electrode active material may contain a mixed negative electrode active material which contains the negative electrode active material (silicon-based negative electrode active material) of the present invention and a carbon-based active material. According to this constitution, electric resistance of the layer of the negative electrode active material is lowered, and it is possible to alleviate the expansion stress accompanying charging. As the carbon-based active material, for example, thermally decomposed carbons, cokes, glassy carbon fibers, fired bodies of organic polymer compounds, carbon blacks and the like may be used. Also, in the mixed negative electrode active material of the present invention, it is preferable that a ratio in terms of mass of the negative electrode active material based on the total amount in terms of mass of the negative electrode active material of the present invention and the carbon-based active material being 6% by mass or more. When the ratio in terms of mass of the negative electrode active material of the present invention is 6% by mass or more, battery capacity can be certainly improved.

The negative electrode active material of the present invention contains particles of the silicon compound, and the particles of the silicon compound are a silicon oxide material containing a silicon compound (SiO$_x$: 0.5≤x≤1.6), and the composition thereof is preferably that where "x" is close to 1. This is because high cycle characteristics can be obtained. The composition of the silicon compound in the present invention does not necessarily mean purity of 100%, and a minute amount of impurity element(s) may be contained.

In the negative electrode active material of the present invention, the particles of the silicon compound contain lithium. In particular, the particles of the silicon compound can contain one or more kinds selected from $Li_2SiO_3$ and $Li_4SiO_4$. These materials are materials in which the $SiO_2$ component portion in the silicon compound, which becomes unstable when lithium is inserted and released at the time of charge and discharge of the battery, has previously been reformed into another lithium silicates, so that irreversible capacity generating at the time of charging can be reduced.

Further, by incorporating at least one kind of $Li_4SiO_4$ and $Li_2SiO_3$ inside the bulk of the particles of the silicon compound, battery characteristics are improved, and when the two kinds of the Li compounds are coexisted, battery characteristics are more improved. These lithium silicates can be quantified by NMR (Nuclear Magnetic Resonance) or XPS (X-ray photoelectron spectroscopy). Measurements of XPS and NMR can be carried out, for example, by the following conditions.

XPS
- Apparatus: X-ray photoelectron spectrometer,
- X-ray source: monochromated Al Kα ray,
- X-ray spot diameter: 100 μm,
- Ar ion gun sputtering condition: 0.5 kV/2 mm×2 mm. $^{29}Si$ MAS NMR (Magic angle spinning nuclear magnetic resonance)
- Apparatus: 700 NMR spectrometer manufactured by Bruker,
- Probe: 50 μL of 4 mm HR-MAS rotor,
- Sample rotation speed: 10 kHz,
- Measurement environment temperature: 25° C.

In the present invention, the particles of the negative electrode active material have a peak in the range of $2\theta=31.8\pm0.5°$ obtained by the X-ray diffraction (XRD) spectrum using Kα line of Cu as shown in FIG. 2. When the negative electrode active material containing such particles of the negative electrode active material is employed, elution of the Li compound from the particles of the negative electrode active material can be suppressed at the time of producing an aqueous negative electrode slurry, so that the Li component inserted at the time of bulk reformation in the particles of the negative electrode active material is retained, and it is possible to minimize the damage by elution of an alkali into the aqueous negative electrode slurry. Therefore, when the negative electrode active material containing such particles of the negative electrode active material is used as a negative electrode active material of a lithium ion secondary battery, a battery having high battery capacity, and good cycle characteristics and initial charge and discharge characteristics can be obtained.

Further, the peak appeared in the range of $2\theta=31.8\pm0.5°$ in the X-ray diffraction spectrum using Kα line of Cu is preferably a peak deriving from a (002) face of Zabuyelite which is a crystal phase of lithium carbonate. By existing the crystallized lithium carbonate having the crystal phase in the particles of the negative electrode active material, elution of an alkali from the bulk of the silicon compound can be more effectively suppressed at the time of producing the aqueous negative electrode slurry, and better cycle characteristics and initial charge and discharge characteristics can be obtained.

In the present invention, the particles of the negative electrode active material are a material, in the X-ray diffraction spectrum, in which an intensity $I_a$ of a peak deriving from an Si (111) face appeared in a range of $2\theta=28.2\pm0.5°$ and an intensity $I_b$ of a peak appeared in a range of $2\theta=31.8\pm0.5°$ preferably satisfy the relationship of the following formula 1.

$$1.0\times10^{-3}<I_b/I_a<1.0\times10^0 \quad \text{Formula 1)}$$

The particles of the negative electrode active material having a ratio of the intensities $I_a$ and $I_b$ of the peaks satisfying the relationship are well balanced between the growth of the crystallite size of Si and the growth of the crystallite size of the Li compound, so that elution of the Li compound into the aqueous negative electrode slurry is suppressed. Therefore, such a negative electrode active material of the present invention can obtain better cycle characteristics and initial charge and discharge characteristics.

The intensities $I_a$ and $I_b$ of the peaks can be obtained, for example, as follows. For example, the intensities $I_a$ and $I_b$ of the peaks are, as shown in FIG. 2, represented by the height of the peak from the baseline calculated from the XRD spectrum using Kα line of Cu. This baseline is obtained from the values of 27.5° and 29.5° in the case of $I_a$, and from the values of 31.0° and 32.5° in the case of $I_b$, and based on this value, the intensity $I_a$ of the peak appeared in the range of $2\theta=28.2\pm0.5°$ and the intensity $I_b$ of the peak appeared in the range of $2\theta=31.8\pm0.5°$ can be determined. The intensities $I_a$ and $I_b$ of the peaks can be obtained. Even if the peak having the intensity $I_a$ appeared in the range of $2\theta=28.2\pm0.5°$ is too broad and actually no peak is obtained, calculation of the intensity $I_a$ of the peak appeared in the range of $2\theta=28.2\pm0.5°$ can be carried out by making the intensity of the maximum value in the range of 27.5° to 29.5° as the peak intensity. In addition, in the case where the peak appeared in the range of $2\theta=31.8\pm0.5°$ is broad, the peak intensity $I_b$ can be calculated the intensity of the maximum value in the range of 31.0° to 32.5° as the peak intensity. Also, a half value width can be made a value determined by fitting mathematically separately from the intensity.

In the present invention, it is also preferable that the particles of the negative electrode active material contain at least one kind of a polyphenylene compound and a polycyclic aromatic compound, the polyphenylene compound is at least one kind of biphenyl, terphenyl, and a derivative thereof, and the polycyclic aromatic compound is at least one kind of naphthalene, anthracene, phenanthrene, naphthacene, pentacene, pyrene, picene, coronene, chrysene, and a derivative thereof. When these materials are contained in the negative electrode active material, it becomes a negative electrode active material having better cycle characteristics and initial charge and discharge characteristics.

In the present invention, it is preferable that the particles of the silicon compound have a half value width (2θ) of a diffraction peak attributable to an Si (111) crystal face in the X-ray diffraction using Kα line of Cu of 1.2° or more and have a crystallite size corresponding to the crystal face of 7.5 nm or less. It is preferable that the silicon crystallinity of the silicon compound in the particles of the silicon compound is as low as possible, and in particular, if the amount of existing Si crystal is a little, battery characteristics can be improved and a stable Li compound can be formed. In the X-ray diffraction spectrum using Kα line of Cu, a diffraction peak caused by the Si (111) crystal face is observed around $2\theta=28.4°$.

The negative electrode active material of the present invention preferably satisfies the relation, in the particles of the silicon compound, a maximum peak intensity value A of Si and Li silicate region given by −60 to −95 ppm as a chemical shift value, and a peak intensity value B of an $SiO_2$ region given by −96 to −150 ppm as a chemical shift value each obtained from $^{29}Si$-MAS-NMR spectrum satisfy a relation A>B. In the particles of the silicon compound, if an amount of the silicon component or $Li_2SiO_3$ is relatively large based on the SiO$_2$ component, the effect of improving battery characteristics by insertion of Li can be sufficiently obtained.

The negative electrode active material of the present invention is preferably a material in which a test cell including a negative electrode which contains a mixture of a negative electrode active material and a carbon-based active material, and a counter electrode lithium is produced, and in the test cell, charging and discharging including charging which is to flow an electric current so that lithium is inserted into the negative electrode active material and discharging which is to flow an electric current so that lithium is released from the negative electrode active material are repeated 30 times, when a graph showing a relationship between a differentiated value dQ/dV in which a discharge capacity Q at each charge and discharge is differentiated by a potential V of the negative electrode based on the counter electrode lithium, and the potential V, then, it is preferable that a peak of the potential V of the negative electrode at the time of discharging after the Xth time ($1 \leq X \leq 30$) is in the range of 0.40 V to 0.55 V. The peak in the V-dQ/dV curve is similar to the peak of the silicon material, and a discharge curve at a higher potential side rises sharply, so that the capacity can be easily exhibited when design of the battery is carried out. In addition, if it is a material in which the peak is exhibited by charge and discharge within 30 times, it can be judged to be a material in which a stable bulk is formed.

In the negative electrode active material of the present invention, the median diameter ($D_{50}$: particle diameter at the time that the cumulative volume is 50%) of the particles of the negative electrode active material is preferably 1.0 μm or more and 15 μm or less. If the median diameter is 1.0 μm or more, the surface area per mass can be made small, and an increase in battery irreversible capacity can be suppressed. If the median diameter is 1.0 μm or more, the surface area per mass can be made small, and an increase in battery irreversible capacity can be suppressed. On the other hand, by making the median diameter 15 μm or less, the particles become difficultly crack whereby new surface hardly comes out, and SEI (solid electrolyte interface) due to the newly generated surface is difficultly generated at the time of charging and discharging, so that loss of reversible Li can be suppressed. Also, if the median diameter of the particles of the silicon-based active material is 15 μm or less, the amount of expansion of the particles of the silicon compound during charging does not become large, so that physical and electrical breakdown of the layer of the negative electrode active material due to expansion can be prevented. As a result, cycle characteristics can be improved.

In the negative electrode active material of the present invention, the particles of the negative electrode active material preferably contain a carbon material at the surface layer portion. The particles of the negative electrode active material contain the carbon material at the surface layer portion, whereby improvement in conductivity can be obtained, so that in the case where the negative electrode active material containing such particles of the negative electrode active material is used for the negative electrode active material of the secondary battery, battery characteristics can be improved.

An average thickness of the carbon material at the surface layer portion of the particles of the negative electrode active material is preferably 10 nm or more and 5,000 nm or less. If the average thickness of the carbon material is 10 nm or more, improvement in conductivity can be obtained, while if the average thickness of the carbon material to be coated is 5,000 nm or less, in the case where the negative electrode active material containing such particles of the negative electrode active material is used for the negative electrode active material of the secondary battery, lowering in battery capacity can be suppressed.

The average thickness of the coated carbon portion can be calculated, for example, according to the following procedure. First, the particles of the negative electrode active material are observed at an arbitrary magnification by TEM (transmission electron microscope). This magnification is preferably such that the thickness of the covering portion can be visually confirmed so that the thickness can be measured. Subsequently, the thickness of the covering portion is measured at arbitrary 15 points. In this case, it is preferable to set the measurement position widely and randomly without concentrating on a specific place as much as possible. Finally, the average value of the thickness of the 15 points at the covering portion is calculated.

Although the covering ratio of the carbon material is not particularly limited, it is desirable that the covering ratio is as high as possible. If the covering ratio is 30% or more, it is preferable since electrical conductivity is further improved. The covering method of the carbon material is not particularly limited, and a sugar carbonization method and a thermal decomposition method of a hydrocarbon gas are preferable. This is because the covering ratio can be improved.

As the binder of the negative electrode contained in the layer of the negative electrode active material, for example, any one or more kinds of polymer materials, synthetic rubbers and the like can be used. Examples of the polymer material may include, for example, polyvinylidene fluoride, polyimide, polyamideimide, aramid, polyacrylic acid, lithium polyacrylate, carboxymethyl cellulose and the like. Examples of the synthetic rubber may include, for example, styrene butadiene-based rubber, fluorine-based rubber, ethylene propylene diene and the like.

As the negative electrode conductive additive, for example, any one or more kinds of carbon materials such as carbon black, acetylene black, graphite, ketjen black, carbon nanotube, carbon nanofiber and the like may be used.

The layer of the negative electrode active material can be formed, for example, by a coating method. The coating method is a method in which the particles of the negative electrode active material and the binder and the like, and, if necessary, a conductive additive, a carbon material are mixed and then dispersed in an organic solvent, water or the like and coated.

[Method for Producing Negative Electrode]

The negative electrode can be produced, for example, according to the following procedure. First, a method for producing the negative electrode active material used for the negative electrode is explained. According to this method, the particles of the negative electrode active material are firstly produced by producing particles of a silicon compound containing a silicon compound (SiO$_x$: $0.5 \leq x \leq 1.6$), and inserting lithium into the particles of the silicon compound. Next, the XRD spectrum of the particles of the negative electrode active material is measured by using Kα line of Cu, and the particles of the negative electrode active material having a peak in the range of $2\theta=31.8\pm0.5°$ are selected. Then, by using the selected particles of the negative electrode active material, a negative electrode active material is produced. According to this procedure, a negative electrode active material having high capacity and good cycle characteristics and initial charge and discharge characteristics can be produced when it is used as a negative electrode active material of a lithium ion secondary battery.

Also, after the step of inserting lithium into the particles of the silicon compound, heat treatment may be carried out at 100° C. to 1,000° C. In the case where SiOx, Li and a carbon source are present in the system, Zabuyelite which is a crystal of lithium carbonate can be formed by this heat treatment, and particles of the negative electrode active material having a peak at $2\theta=31.8\pm0.5°$ can be more reliably obtained. In addition, Zabuyelite can be more reliably obtained by adding lithium carbonate to the system and carrying out the heat treatment.

More specifically, the negative electrode active material can be produced as follows. First, a raw material that generates a silicon oxide gas are heated at a temperature range of 900° C. to 1,600° C. under reduced pressure in the presence of an inert gas, to generate a silicon oxide gas. When the presence of surface oxygen on the metal silicon powder and a minute amount of oxygen in a reaction furnace are considered, the mixing ratio is desirably in the range of 0.8<metal silicon powder/silicon dioxide powder<1.3.

The generated silicon oxide gas is solidified and deposited on an adsorption plate. Next, at the state where the temperature in the reaction furnace is lowered at 100° C. or less, the deposit of silicon oxide is taken out and pulverized and powdered using a ball mill, a jet mill or the like. The particles of the silicon compound containing nickel can be produced. Incidentally, the Si crystallite in the particles of the silicon compound can be controlled by changing the temperature of vaporization, or, by the heat treatment after the formation.

Here, a layer of a carbon material may be formed at the surface layer of the particles of the silicon compound. As a method of forming a layer of the carbon material, a thermal decomposition CVD method is desirable. An example of a method for forming a layer of the carbon material by the thermal decomposition CVD is explained.

First, the particles of the silicon compound are set in a furnace. Next, a hydrocarbon gas is introduced into the furnace, and the temperature in the furnace is raised. The decomposition temperature is not particularly limited, and is desirably 1,200° C. or less, more desirably 950° C. or less. By setting the decomposition temperature to 1,200° C. or less, unintended disproportionation of the particles of the active material can be suppressed. After raising the temperature in the furnace to a predetermined temperature, a carbon layer is formed on the surface of the particles of the silicon compound. The hydrocarbon gas used as the raw material of the carbon material is not particularly limited, and it is desirable that $n\leq3$ in the composition of $C_nH_m$. If $n\leq3$, the production cost can be lowered, and the physical properties of the decomposed product can be improved.

Next, lithium is inserted into the particles of the produced silicon compound to produce particles of the negative electrode active material. At this time, it is preferred to incorporate at least one kind of $Li_2SiO_3$ and $Li_4SiO_4$ into the particles of the negative electrode active material. Insertion of lithium is particularly preferably carried out by an electrochemical method or an oxidation-reduction method.

In the reforming by the electrochemical method, the apparatus structure is not particularly limited and, for example, Li can be inserted by using an electrochemical Li-doping reformer 20 shown in FIG. 9. The electrochemical Li-doping reformer 20 has a bath 27 filled with an organic solvent 23, a positive electrode (lithium source) 21 located in the bath 27 and connected to one of power sources 26, a powder storage container 25 located in the bath 27 and connected to the other side of the power sources 26, and a separator 24 provided between the positive electrode 21 and the powder storage container 25. In the powder storage container 25, the particles of the silicon compound 22 are stored.

As the organic solvent 23 in the bath 27, ethylene carbonate, propylene carbonate, dimethyl carbonate, diethyl carbonate, ethyl methyl carbonate, fluoromethyl methyl carbonate, difluoromethyl methyl carbonate and the like can be used. As the electrolyte salt contained in the organic solvent 23, lithium hexafluorophosphate ($LiPF_6$), lithium tetrafluoroborate ($LiBF_4$) and the like can be used.

As the positive electrode 21, a Li foil may be used, and a Li-containing compound may be used. The Li-containing compound may be mentioned lithium carbonate, lithium oxide and the like.

After the electrochemical Li-doping reforming, the particles of the negative electrode active material may be washed with an alcohol, an alkaline water, a weak acid, pure water or the like.

In the case where the oxidation-reduction method is used, for example, lithium can be inserted into the particles of the silicon compound by contacting particles of the silicon compound with a solution A which contains lithium, and a solvent is an ether-based solvent. In addition, as the solution A contains lithium, it is preferable to use a solution $A_1$ which contains lithium, and contains one or more kinds selected from a polyphenylene compound and a derivative thereof and a polycyclic aromatic compound and a derivative thereof, and a solvent thereof is an ether-based solvent, or a solution $A_2$ which contains lithium and an amine, and a solvent thereof is an ether-based solvent.

As the ether-based solvent to be used in the solutions A, $A_1$ and $A_2$, diethyl ether, tert-butyl methyl ether, tetrahydrofuran, dioxane, 1,2-dimethoxyethane, diethylene glycol dimethyl ether, triethylene glycol dimethyl ether, tetraethylene glycol dimethyl ether, or a mixed solvent thereof, and the like may be used. Among these, tetrahydrofuran, dioxane and 1,2-dimethoxyethane are particularly preferably used. These solvents are preferably dehydrated, or preferably deoxygenated.

In addition, as the polyphenylene compound and a derivative thereof contained in the solution $A_1$, one or more kinds selected from biphenyl, terphenyl, and a derivative thereof can be used. In addition, as the polycyclic aromatic compound and a derivative thereof contained in the solution $A_1$, one or more kinds selected from naphthalene, anthracene, phenanthrene, naphthacene, pentacene, pyrene, picene, triphenylene, coronene, chrysene, and a derivative thereof may be used.

As the amines contained in the solution $A_2$, dimethylamine, ethylamine, diethylamine, ethylenediamine, triethylenetriamine and the like may be used.

After insertion of the lithium, the particles of the silicon oxide are immersed in a solution B containing a polycyclic aromatic compound and a derivative thereof, active lithium can be released from the particles of the silicon oxide. According to this procedure, stability when the negative electrode active material is made an aqueous negative electrode slurry may be improved. As a solvent of the solution B, for example, an ether-based solvent, a ketone-based solvent, an ester-based solvent, an alcohol-based solvent, an amine-based solvent, or a mixed solvent thereof may be used.

As the polycyclic aromatic compound contained in the solution B, one or more kinds of naphthalene, anthracene, phenanthrene, naphthacene, pentacene, pyrene, picene, triphenylene, coronene, chrysene and a derivative thereof may be used.

As the ether-based solvent, diethyl ether, tert-butyl methyl ether, tetrahydrofuran, dioxane, 1,2-dimethoxyethane, diethylene glycol dimethyl ether, triethylene glycol dimethyl ether, and tetraethylene glycol dimethyl ether and the like may be used.

As the ketone-based solvent, acetone, acetophenone and the like may be used.

As the ester-based solvent, methyl formate, methyl acetate, ethyl acetate, propyl acetate, and isopropyl acetate and the like may be used.

As the alcohol-based solvent, methanol, ethanol, propanol, and isopropyl alcohol and the like may be used.

As the amine-based solvent, methylamine, ethylamine, and ethylenediamine and the like may be used.

A mixed solvent in which two or more kinds among the ether-based solvent, the ketone-based solvent, the ester-based solvent, the alcohol-based solvent and the amine-based solvent, and the like may be used in combination.

Li may be also inserted into the particles of the negative electrode active material by a thermal doping method. In this case, for example, it can be reformed by mixing the particles of the silicon compound with LiH powder or Li powder, and heating in a non-oxidizing atmosphere. As the non-oxidizing atmosphere, for example, Ar atmosphere or the like can be used. More specifically, firstly, LiH powder or Li powder and the particles of the silicon compound are thoroughly mixed under Ar atmosphere, then, sealing is carried out, and stirring is carried out with the sealed container to homogenize the mixture. Thereafter, heating is carried out in the range of 700° C. to 850° C. to carry out reforming. In this case, in order to release active Li from the particles of the silicon compound, it may be used a method in which powder after heating is sufficiently cooled, and then washing with an alcohol, an alkaline water, a weak acid, pure water or the like. According to the procedure, stability when the negative electrode active material is made an aqueous negative electrode slurry can be improved.

When the reforming is carried out by a thermal doping method, the $^{29}$Si-MAS-NMR spectrum obtained from the particles of the silicon compound is different from the case where the oxidation-reduction method is used. FIG. 4 shows one example of the $^{29}$Si-MAS-NMR spectrum measured from the particles of the silicon compound when the reforming is carried out by the oxidation-reduction method. In FIG. 4, a peak given in the vicinity of −75 ppm is a peak deriving from $Li_2SiO_3$, and a peak given from −80 to −100 ppm is a peak deriving from Si. There may be peak(s) of Li silicate(s) other than $Li_2SiO_3$ and $Li_4SiO_4$ over −80 to −100 ppm in some cases.

In addition, FIG. 5 shows one example of the $^{29}$Si-MAS-NMR spectrum measured from the particles of the silicon compound when the reforming is carried out by the thermal doping method. In FIG. 5, a peak given in the vicinity of −75 ppm is a peak deriving from $Li_2SiO_3$, and a peak given from −80 to −100 ppm is a peak deriving from Si. There may be peak(s) of Li silicate(s) other than $Li_2SiO_3$ and $Li_4SiO_4$ over −80 to −100 ppm in some cases. The peak of $Li_4SiO_4$ can be confirmed from the XPS spectrum.

Next, the particles of the negative electrode active material after reforming may be heated in Ar at a temperature of 100° C. to 1,000° C. According to this heating, intensity of a peak appeared in the range of 2θ=31.8±0.5° in the XRD spectrum can be adjusted.

When the doping using the electrochemical method or the doping using the oxidation-reduction method is carried out, an organic Li salt by-produced by inserting Li can become Zabuyelite since it is decomposed and crystallized due to heating after reforming. Incidentally, the organic Li salt can be, for example, by-produced from an organic solvent 23 and the like in FIG. 2 in the electrochemical method. In addition, in the oxidation-reduction method, for example, it can be by-produced from an ether-based solvent and the like contained in the solution A.

The particles of the negative electrode active material containing Zabuyelite can be obtained, for example, by mixing a substance containing lithium carbonate and a silicon compound, and further the particles of the negative electrode active material are heated at 100 to 1,000° C. In particular, when reforming is carried out by a thermal doping method, a substance containing lithium carbonate is mixed with the particles of the silicon compound at the time of thermal doping and heated, then, Zabuyelite can be formed. That is, in the thermal doping, insertion of lithium into the silicon compound and formation of Zabuyelite can be carried out simultaneously.

After producing the particles of the negative electrode active material by incorporating lithium into the particles of the silicon compound, particles having a peak in the range of 2θ=31.8±0.5° in the X-ray diffraction spectrum using Kα line of Cu are selected from the particles of the negative electrode active material.

Incidentally, selection of the particles of the negative electrode active material is not necessarily carried out every time the negative electrode active material is produced, and when the conditions of production of the particles of the negative electrode active material at which the peak appears in the range of 2θ=31.8±0.5° in the X-ray diffraction spectrum using Kα line of Cu are found out and selected, the negative electrode active material can be thereafter produced by the same conditions as the conditions at which the particles are selected.

The produced negative electrode active material, and other materials such as a negative electrode binder, a conductive additive and the like are mixed to form a negative electrode mixture, and then, an organic solvent, water, or the like is added thereto to prepare a slurry. Next, the slurry is coated onto the surface of a negative electrode current collector, and dried to form a layer of the negative electrode active material. At this time, hot press or the like may be carried out as necessary. The negative electrode can be produced in this manner.

<Lithium Ion Secondary Battery>

Next, the lithium ion secondary battery containing the negative electrode active material of the present invention is explained. The lithium ion secondary battery containing the negative electrode active material of the present invention is a material using the negative electrode which contains the negative electrode active material of the present invention. Here, as specific examples, a laminate film type lithium ion secondary battery is mentioned as an example.

[Constitution of Laminate Film Type Secondary Battery]

The laminate film type lithium ion secondary battery 30 shown in FIG. 6 is a material in which a spirally wound electrode body 31 is housed mainly inside of a sheet-state exterior member 35. This spirally wound electrode body has a separator between a positive electrode and a negative electrode, and is wound. In addition, there is a case where it has a separator between a positive electrode and a negative electrode, and a laminate is housed. In either of the electrode bodies, a positive electrode lead 32 is attached to the positive electrode, and a negative electrode lead 33 is attached to the negative electrode. The outermost peripheral portion of the electrode body is protected by a protective tape.

The positive and negative electrode leads are, for example, led out from the inside to the outside of an exterior member in one direction. The positive electrode lead 32 is formed, for example, by a conductive material such as aluminum and the like, and the negative electrode lead 33 is formed, for example, by a conductive material such as nickel, copper and the like.

The exterior member 35 is, for example, a laminate film in which a fusion layer, a metallic layer and a surface protective layer are laminated in this order, and the laminate film is so formed that the outer peripheral edge portions of the fusion layers of the two laminated films are fused to each other or bonded with an adhesive or the like so as to face the fusion layer to the electrode body. The fusion layer is, for example, a film such as polyethylene, polypropylene and the like, and the metallic layer is an aluminum foil and the like. The protective layer is, for example, nylon and the like.

An adhesive film 34 is inserted between the exterior member 35 and the positive and negative electrode leads for the prevention of outside air intrusion. The material thereof is, for example, polyethylene, polypropylene, or polyolefin resin.

[Positive Electrode]

The positive electrode has, for example, a layer of the positive electrode active material(s) on both sides or one side of a positive electrode current collector similar to the negative electrode 10 of FIG. 1. The positive electrode current collector is formed, for example, by a conductive material such as aluminum and the like. The layer of the positive electrode active material contains any one or two or more kinds of positive electrode materials capable of storing and releasing lithium ions, and may contain other materials such as a binder, a conductive additive, a dispersant and the like depending on the design. In this case, details regarding the binder and the conductive additive can be, for example, the same as those of the negative electrode binder and the negative electrode conductive additive.

As the positive electrode material, a lithium-containing compound is desirable. The lithium-containing compound may be mentioned, for example, a composite oxide including lithium and a transition metal element, or a phosphate compound having lithium and a transition metal element. Among these positive electrode materials, a compound having at least one kind of nickel, iron, manganese and cobalt is preferable. The chemical formulae of these positive electrode materials are represented by, for example, $Li_xM1O_2$ or $Li_yM2PO_4$, In the formulae, M1 and M2 each represent at least one transition metal element, and the values of "x" and "y" vary depending on the state of charge and discharge of the battery, and these generally represent $0.05 \leq x \leq 1.10$ and $0.05 \leq y \leq 1.10$.

Examples of the composite oxides having lithium and a transition metal element may be mentioned, for example, lithium cobalt composite oxide ($Li_xCoO_2$), lithium nickel composite oxide ($Li_xNiO_2$), and the like. Examples of the phosphate compound having lithium and a transition metal element may be mentioned, for example, lithium iron phosphate compound ($LiFePO_4$), lithium iron manganese phosphate compound ($LiFe_{1-u}Mn_uPO_4$ ($0<u<1$)), and the like. By using these positive electrode materials, high battery capacity can be obtained and excellent cycle characteristics can be also obtained.

[Negative Electrode]

The negative electrode has a structure similar to that of the negative electrode for the non-aqueous electrolyte secondary battery of FIG. 1, and has, for example, a layer of a negative electrode active material on both sides of the current collector. In this negative electrode, it is preferable that the negative electrode charge capacity is larger than the electric capacity (charge capacity as a battery) obtained from a positive electrode active material agent. According to this constitution, deposition of lithium metal on the negative electrode can be suppressed.

The layer of the positive electrode active material is provided on a part of both surfaces of the positive electrode current collector, and the layer of the negative electrode active material is also provided on a part of both surfaces of the negative electrode current collector. In this case, for example, the layer of the negative electrode active material provided on the negative electrode current collector is provided with a region where no opposing layer of the positive electrode active material exists. This is to carry out a stable battery design.

At the region where the layer of the negative electrode active material and the layer of the positive electrode active material do not oppose to each other, there is almost no influence of charge and discharge. Therefore, the state of the layer of the negative electrode active material is maintained immediately after the formation, whereby the composition of the negative electrode active material or the like, can be accurately examined with good reproducibility without depending on the presence or absence of charge and discharge.

[Separator]

The separator is a material which separates the positive electrode and the negative electrode, and allows lithium ions to pass while preventing a current short circuit caused by contacting the both electrodes. This separator is made of, for example, a synthetic resin, or a porous film made of ceramic, and may have a laminated structure in which two or more kinds of porous films are laminated. The synthetic resin may be mentioned, for example, polytetrafluoroethylene, polypropylene, polyethylene, and the like.

[Electrolyte]

At least a part of the layer of the active material or the separator is impregnated with a liquid electrolyte (an electrolytic solution). In this electrolytic solution, an electrolyte salt is dissolved in a solvent, and other materials such as additives and the like may be also contained.

The solvent may be used, for example, a non-aqueous solvent. The non-aqueous solvent may be mentioned, for example, ethylene carbonate, propylene carbonate, butylene carbonate, dimethyl carbonate, diethyl carbonate, ethyl methyl carbonate, methyl propyl carbonate, 1,2-dimethoxyethane, tetrahydrofuran and the like. Among these, it is desirable to use at least one of ethylene carbonate, propylene carbonate, dimethyl carbonate, diethyl carbonate and ethyl methyl carbonate. This is because better characteristics can be obtained. In this case, by using a high viscosity solvent such as ethylene carbonate, propylene carbonate or the like, in combination with a low viscosity solvent such as dimethyl carbonate, ethyl methyl carbonate, diethyl carbonate or the like, more advantageous characteristics can be obtained. This is because dissociation property and ion mobility of the electrolyte salt are improved.

In the case of using an alloy-based negative electrode, it is particularly desirable that at least one of a halogenated linear carbonic acid ester and a halogenated cyclic carbonic acid ester is contained as a solvent. According to this constitution, a stable coating film can be formed on the surface of the negative electrode active material at the time of charge and discharge, particularly at the time of charging. The halogenated linear carbonic acid ester is a linear carbonic acid ester having a halogen as a constituent element (at least one hydrogen is substituted by a halogen). The halogenated cyclic carbonic acid ester is a cyclic carbonic acid ester having a halogen as a constituent element (at least one hydrogen is substituted by a halogen).

The kind of the halogen is not particularly limited, and fluorine is more preferable. This is because a coating film having better quality than the other halogens is formed. In addition, the number of the halogens is desirably as large as possible. This is because the obtained coating film is more stable and the decomposition reaction of the electrolytic solution is reduced.

The halogenated linear carbonic acid ester may be mentioned, for example, fluoromethyl methyl carbonate, difluoromethyl methyl carbonate and the like. The halogenated cyclic carbonic acid ester may be mentioned 4-fluoro-1,3-dioxolan-2-one, 4,5-difluoro-1,3-dioxolan-2-one and the like.

As a solvent additive, it is preferable to contain an unsaturated carbon bond cyclic carbonic acid ester. This is because a stable coating film is formed on the surface of the negative electrode at the time of charge and discharge, and the decomposition reaction of the electrolytic solution can be suppressed. The unsaturated carbon bond cyclic carbonic acid ester may be mentioned, for example, vinylene carbonate, vinyl ethylene carbonate and the like.

It is also preferable that sultone (cyclic sulfonic acid ester) is contained as a solvent additive. This is because chemical stability of the battery is improved. The sultone may be mentioned, for example, propane sultone and propene sultone.

Further, it is preferable that the solvent contains an acid anhydride. This is because chemical stability of the electrolytic solution is improved. Examples of the acid anhydride may include, for example, propane disulfonic acid anhydride.

The electrolyte salt may include, for example, at least one of light metal salts such as a lithium salt and the like. The lithium salt may be mentioned, for example, lithium hexafluorophosphate ($LiPF_6$), lithium tetrafluoroborate ($LiBF_4$), and the like.

The content of the electrolyte salt is preferably 0.5 mol/kg or more and 2.5 mol/kg or less based on the content of the solvent. This is because high ion conductivity can be obtained.

[Method for Producing Laminate Film Type Secondary Battery]

Initially, a positive electrode is produced by using the positive electrode material. First, a positive electrode active material and, if necessary, a binder, a conductive additive and the like are mixed to form a positive electrode mixture, and then, dispersed in an organic solvent to prepare a positive electrode mixture slurry. Subsequently, the mixture slurry is coated to the positive electrode current collector with a coating apparatus such as a knife roll, a die coater having a die head and the like, and dried with hot air to obtain a layer of the positive electrode active material. Finally, the layer of the positive electrode active material is compression molded by a roll press machine or the like. At this time, heating or compression may be repeated a plurality of times.

Next, the same operation procedure as in the negative electrode for the non-aqueous electrolyte secondary battery is carried out, and a layer of a negative electrode active material is formed on the negative electrode current collector to produce a negative electrode.

At the time of producing the positive electrode and the negative electrode, respective layers of the active materials are formed on both surfaces of the positive electrode and the negative electrode current collector. At this time, a coated length of the active material on both surfaces of either of the electrodes may be deviated (see FIG. 1).

Subsequently, an electrolytic solution is prepared. Then, a positive electrode lead is attached to the positive electrode current collector and a negative electrode lead is attached to the negative electrode current collector by ultrasonic welding or the like. Subsequently, the positive electrode and the negative electrode are laminated or wound through a separator to produce a spirally wound electrode body, and a protective tape is adhered to the outermost peripheral portion thereof. Next, the spirally wound body is molded so as to have a flat shape. Then, after the spirally wound electrode body is sandwiched between the folded film-shaped exterior members, the insulation portions of the exterior member are adhered to each other by a thermal fusion method, and in a state where the wound electrode body is released in only one direction, the spirally wound electrode body is sealed. An adhesive film is inserted between the positive electrode lead, and the negative electrode lead and the exterior member. Then, a prescribed amount of the prepared electrolytic solution was charged from the released portion and subjected to vacuum impregnation. After impregnation, the released portion is bonded by a vacuum thermal fusion method. The laminate film type secondary battery can be produced.

EXAMPLES

In the following, the present invention will be explained more specifically with reference to Examples and Comparative Examples, but the present invention is not limited to these Examples.

Example 1-1

According to the following procedure, the laminate film type lithium secondary battery 30 shown in FIG. 6 was produced.

A positive electrode was firstly produced. A positive electrode mixture was prepared by mixing 95% by mass of $LiNi_{0.7}Co_{0.25}Al_{0.05}O$ which is a lithium nickel cobalt composite oxide as a positive electrode active material, 2.5% by mass of a positive electrode conductive additive, and 2.5% by mass of a positive electrode binder (polyvinylidene fluoride: PVDF). Subsequently, the positive electrode mixture was dispersed in an organic solvent (N-methyl-2-pyrrolidone: NMP) to form a paste-state slurry. Then, the slurry was applied on both surfaces of the positive electrode current collector by a coating apparatus having a die head and dried with a hot air drying apparatus. At this time, as the positive electrode current collector, that having a thickness of 15 μm was used. Finally, compression molding was carried out with a roll press.

Next, a negative electrode was produced. The negative electrode active material was prepared by introducing a raw material obtained by mixing metal silicon and silicon dioxide into a reaction furnace, vaporizing it in an atmosphere having a degree of vacuum of 10 Pa and depositing it on an adsorption plate, and after sufficiently cooling, taking out the deposit material and pulverizing the same with a ball mill. The value "x" of $SiO_x$ of the thus obtained particles of the silicon compound was 0.5. Subsequently, the particle size of the particles of the silicon compound was adjusted by classification. Thereafter, a carbon material was coated on the surface of the particles of the silicon compound by subjecting to thermal CVD, which was used as the particles of the negative electrode active material.

Subsequently, lithium was inserted into the particles of the silicon compound on which the carbon material has been coated by an oxidation-reduction method and reformed. First, the particles of the silicon compound were immersed in a solution (solution $A_1$) in which lithium pieces and biphenyl which is a polyphenylene compound had been dissolved in tetrahydrofuran (hereinafter also referred to as THF). The solution $A_1$ of Example 1-1 was prepared by dissolving biphenyl in a THF solvent at a concentration of 1 mol/L, and then adding lithium pieces with a mass content of 10% by mass to the mixed solution of THF and biphenyl. In addition, the temperature of the solution when the particles of the negative electrode active material are immersed therein was 20° C. and an immersion time was made 10 hours. Thereafter, the particles of the silicon compound were collected by filtration. According to the procedure, lithium was inserted into the particles of the silicon compound.

Next, the particles of the silicon compound after insertion of the lithium were immersed in a solution (solution B) in which naphthalene has been dissolved in THF. The solution B of Example 1-1 was prepared by dissolving naphthalene in a THF solvent at a concentration of 2 mol/L. The temperature of the solution at the time of immersing the particles of the silicon compound therein was made 20° C., and the immersion time was 20 hours. Thereafter, the particles of the silicon compound were collected by filtration. According to this procedure, active lithium of the particles of the silicon compound was released.

Then, 20 g of the particles of the negative electrode active material after reforming was subjected to heat treatment in Ar at 800° C. By the heat treatment, Zabuyelite was formed from an organic Li salt by-produced by the oxidation-reduction method. That is, the particles of the negative electrode active material having a peak deriving from the (002) face of Zabuyelite in the range of 31.8±0.5° measured by XRD spectrum using Cu-Kα were produced.

The produced particles of the negative electrode active material, and a carbon-based active material were formulated with a mass ratio of 1:9 to produce a negative electrode active material. Here, as the carbon-based active material, a material in which natural graphite coated with a pitch layer and artificial graphite had been mixed with a mass ratio of 5:5 was used. The median diameter of the carbon-based active material was 20 μm.

Next, the produced negative electrode active material, a conductive additive 1 (carbon nanotube, CNT), a conductive additive 2 (carbon fine particles having the median diameter of about 50 nm), styrene-butadiene rubber (styrene-butadiene copolymer, hereinafter referred to as SBR), and carboxymethyl cellulose (hereinafter referred to as CMC) were mixed with a dry mass ratio of 92.5:1:1:2.5:3, and then, diluted with pure water to prepare a negative electrode mixture slurry. Incidentally, the SBR and CMC are negative electrode binders (negative electrode binding agent).

As the negative electrode current collector, an electrolytic copper foil having a thickness of 15 μm was used. Finally, a slurry of the negative electrode mixture was coated to the negative electrode current collector and dried at 100° C. for 1 hour in a vacuum atmosphere. The deposited amount (also called as area density) of the layer of the negative electrode active material per unit area on one surface of the negative electrode after drying was about 5 mg/cm$^2$.

Next, after mixing the solvents (4-fluoro-1,3-dioxolane-2-one (FEC), ethylene carbonate (EC) and dimethyl carbonate (DMC)), an electrolyte salt (lithium hexafluorophosphate: $LiPF_6$) was dissolved therein to prepare an electrolytic solution. In this case, the composition of the solvent was made FEC:EC:DMC=10:20:70 in a volume ratio, and the content of the electrolyte salt was made 1.2 mol/kg based on the content of the solvent.

Next, a secondary battery was assembled as follows. First, an aluminum lead was ultrasonically welded to one end of the positive electrode current collector, and a nickel lead was welded to one end of the negative electrode current collector. Subsequently, a positive electrode, a separator, a negative electrode, and a separator were laminated in this order and wound in a longitudinal direction to obtain a spirally wound electrode body. The winding end portion was fixed with a PET protective tape. As the separator, a laminated film (thickness: 12 μm) in which a film containing porous polyethylene as a main component was sandwiched by films containing porous polypropylene as a main component was used. Subsequently, after sandwiching the electrode body between exterior members, outer peripheral edges except for one side were thermally fused, and the electrode body was accommodated inside thereof. As the exterior member, an aluminum laminate film in which a nylon film, an aluminum foil and a polypropylene film had been laminated was used. Then, the prepared electrolytic solution was injected from the opening, impregnated in a vacuum atmosphere, then heat fused and sealed.

The cycle characteristics and the first time charge and discharge characteristics of the secondary battery produced were evaluated.

The cycle characteristics were examined as follows. First, for battery stabilization, 2nd cycle discharge capacity was measured by carrying out two cycles of charge and discharge at 0.2 C in an atmosphere at 25° C. Subsequently, charge and discharge was carried out until the total number of cycles reached 499th cycles, and the discharge capacity was measured each time. Finally, the discharge capacity at the 500th cycle obtained charge and discharge at 0.2 C was divided by the discharge capacity at the 2nd cycle to calculate the capacity retention rate (hereinafter also simply referred to as retention rate). In the normal cycle, that is, from the third cycle to the 499th cycle, charging and discharging was carried out with 0.7 C charging and 0.5 C discharging.

When the first time charge and discharge characteristics are to be examined, first time efficiency (hereinafter sometimes also referred to as initial efficiency) was calculated. The first time efficiency was calculated from the formula represented by the first time efficiency (%)=(first time discharge capacity/first time charge capacity)×100. The atmospheric temperature was set in the same manner as in the case where the cycle characteristics were examined.

Example 1-2 to Example 1-5, and Comparative Examples 1-1 and 1-2

A secondary battery was produced in the same manner as in Example 1-1 except for adjusting an amount of oxygen in the bulk of the silicon compound. In this case, the amount of oxygen was adjusted by changing the ratio of metal silicon and silicon dioxide in the raw material of the silicon compound or the heating temperature. The value of "x" of the silicon compound represented by $SiO_x$ in Examples 1-1 to 1-5, and Comparative Examples 1-1 and 1-2 are shown in Table 1.

At this time, the particles of the silicon-based active material of Examples 1-1 to 1-5 and Comparative Examples 1-1 and 1-2 had the following properties. $Li_2SiO_3$ and $Li_4SiO_4$ were contained inside of the particles of the silicon compound in the particles of the negative electrode active material. The median diameter $D_{50}$ of the particles of the negative electrode active material was 4.0 μm. The silicon compound had a half value width (2θ) of a diffraction peak attributable to the Si (111) crystal face obtained by X-ray diffraction of 2.257°, and had a crystallite size caused by the Si (111) crystal face of 3.77 nm.

In all of the Examples and Comparative Examples, peaks of Si and Li silicate region which are given as chemical shift values obtained from the $^{29}$Si-MAS-NMR spectrum at −60 to −95 ppm were appeared. Also, in all of the Examples and Comparative Examples, the relationship between a maximum peak intensity value A of the Si and Li silicate region given as −60 to −95 ppm, and a peak intensity value B of the $SiO_2$ region given as −96 to −150 ppm as the chemical shift value obtained from the $^{29}$Si-MAS-NMR spectrum was A>B.

The average thickness of the carbon material contained in the particles of the negative electrode active material was 100 nm.

In the XRD spectrum measured by using Cu-Kα by making 1.5 g of the particles of the negative electrode active material in a plane, the intensity $I_a$ of the peak derived from the Si (111) face appeared in the range of 2θ=28.2±0.5° and in the same XRD spectrum, the intensity $I_b$ of the peak appeared in the range of 2θ=31.8±0.5° satisfied the relationship of $I_b/I_a$=4.0×10$^{-2}$. That is, these satisfy the following formula 1.

$$1.0\times10^{-3} < I_b/I_a < 1.0\times10^0 \quad \text{Formula 1)}$$

Also, in the particles of the negative electrode active material, biphenyl was contained as the polyphenyl compound and naphthalene as the polycyclic aromatics.

Further, a coin battery type test cell of 2032 size was produced from the negative electrode, and a counter electrode lithium, and its discharge behavior was evaluated. More specifically, firstly, constant current constant voltage charge was carried out to 0 V with the counter electrode Li, and charging was terminated when the current density reached 0.05 mA/cm$^2$. Thereafter, a constant current discharge was carried out up to 1.2 V. The current density at this time was 0.2 mA/cm$^2$. This charging and discharging was repeated 30 times, and a graph was drawn with the change rate of capacity (dQ/dV) on the vertical axis and voltage (V) on the horizontal axis from the data obtained at each charge and discharge, and whether a peak was obtained in the range of V of 0.4 to 0.55 (V) or not was confirmed. As a result, in Comparative Example 1 in which "x" of SiOx is less than 0.5, the peak was not obtained. In the other Examples and Comparative Examples, the peak was obtained in charging and discharging within 30 times, and the peak was obtained in all charging and discharging from the charge and discharge in which the peak first occurred to the 30th charge and discharge.

The evaluation results of Examples 1-1 to 1-3, and Comparative Examples 1-1 and 1-2 are shown in Table 1.

TABLE 1

$SiOx$ $D_{50}$ = 4 μm, Graphite (Natural graphite:Artificial graphite = 5:5) $D_{50}$ = 20 μm, SiOx ratio: 10% by mass, $Li_2SiO_3$, $Li_4SiO_4$, Carbon material: Average thickness 100 nm, Si (111) half value width: 2.257°, Crystallite: 3.77 nm, Process: Oxidation-reduction doping → Thermal method, A > B, Peak derived from (002) face of Zabuyelite: present, $I_b/I_a$ = 4.0 × 10$^{-2}$

| | SiOx (X=) | Capacity retention rate (%) | Initial efficiency (%) |
|---|---|---|---|
| Comparative example 1-1 | 0.3 | 75.3 | 84.4 |
| Example 1-1 | 0.5 | 79.9 | 88.1 |
| Example 1-2 | 0.7 | 81.9 | 88.7 |
| Example 1-3 | 0.95 | 80.4 | 89.1 |
| Example 1-4 | 1.2 | 80.8 | 88.6 |
| Example 1-5 | 1.45 | 81.0 | 87.7 |
| Comparative example 1-2 | 1.8 | — | — |

As shown in Table 1, in the silicon compound represented by SiOx, if the value "x" is out of the range of 0.5≤x≤1.6, battery characteristics were worsened. For example, as shown in Comparative Example 1-1, when oxygen is not present sufficiently (x=0.3), whereas first time efficiency is improved, capacity retention rate is markedly worsened. On the other hand, as shown in Comparative Example 1-2, when the amount of oxygen was large (x=1.8), lowering in conductivity was generated and a capacity of the silicon oxide did not substantially appear, so that evaluation was stopped.

Example 2-1 and Example 2-2

A secondary battery was produced in the same conditions as in Example 1-3 except for changing the kind of lithium silicate contained inside of the particles of the silicon compound, and cycle characteristics and initial efficiency were evaluated. The kind of the lithium silicate was controlled by changing the conditions of the lithium insertion step by the oxidation-reduction method.

Comparative Example 2-1

A secondary battery was produced in the same conditions as in Example 1-3 except for not inserting lithium into the particles of the negative electrode active material, and cycle characteristics and initial efficiency were evaluated.

The results of Example 2-1, Example 2-2, and Comparative Example 2-1 are shown in Table 2.

TABLE 2

SiOx x = 0.95, $D_{50}$ = 4 μm, Graphite (Natural graphite:Artificial graphite = 5:5) $D_{50}$ = 20 μm, SiOx ratio 10% by mass, Carbon material: Average thickness 100 nm, Si (111) half value width: 2.257°, Crystallite: 3.77 nm, Process: Oxidation-reduction doping → Thermal method, A > B, dQ/dV: present, Peak derived from (002) face of Zabuyelite: present, $I_b/I_a$ = 4.0 × 10$^{-2}$

| | Kind of lithium silicate | Capacity retention rate (%) | Initial efficiency (%) |
|---|---|---|---|
| Comparative example 2-1 | — | 77.9 | 79.1 |
| Example 2-1 | $Li_2SiO_3$ | 79.8 | 88.0 |
| Example 2-2 | $Li_4SiO_4$ | 79.9 | 88.7 |
| Example 1-3 | $Li_2SiO_3$ and $Li_4SiO_4$ | 80.4 | 89.1 |

When the silicon compound contained stable lithium silicate such as $Li_2SiO_3$ and $Li_4SiO_4$, cycle characteristics, and initial charge and discharge characteristics were improved. In particular, when it contained lithium silicates of both $Li_2SiO_3$ and $Li_4SiO_4$, cycle characteristics, and initial charge and discharge characteristics were more improved. On the other hand, in Comparative Example 2-1 in which no reforming was carried out and no lithium silicate was contained, i.e., no lithium is contained in the silicon compound, cycle characteristics, and initial charge and discharge characteristics were lowered.

Example 3-1 to 3-4

A secondary battery was produced in the same conditions as in Example 1-3 except for changing the intensity ratio $I_b/I_a$ of the peaks of the particles of the negative electrode active material in the XRD spectrum using Cu-Kα to those shown in Table 3, and cycle characteristics and initial efficiency were evaluated. $I_b/I_a$ was adjusted by changing a disproportionation degree the silicon compound and the temperature of the heat treatment after bulk reforming.

TABLE 3

SiOx x = 0.95, $D_{50}$ = 4 μm, Graphite (Natural graphite:Artificial graphite = 5:5) $D_{50}$ = 20 μm, SiOx ratio 10% by mass, Carbon material: Average thickness 100 nm, Process: Oxidation-reduction doping → Thermal method, A > B, dQ/dV: present, Peak derived from (002) face of Zabuyelite: present

|  | $I_b/I_a$ | Capacity retention rate (%) | Initial efficiency (%) |
|---|---|---|---|
| Example 1-3 | $4.0 \times 10^{-2}$ | 80.4 | 89.1 |
| Example 3-1 | $8.0 \times 10^{-3}$ | 80.4 | 89.0 |
| Example 3-2 | $5.0 \times 10^{-1}$ | 80.1 | 89.2 |
| Example 3-3 | $3.0 \times 10^{-0}$ | 80.4 | 88.5 |
| Example 3-4 | $7.5 \times 10^{-4}$ | 78.5 | 89.3 |

As can be seen from Table 3, when the $I_b/I_a$ was in the range of $1.0 \times 10^{-3} < I_b/I_a < 1.0 \times 10^{0}$, battery characteristics were particularly excellent.

Examples 4-1 to 4-8

A secondary battery was produced in the same conditions as in Example 1-3 except for changing crystallinity of Si crystallite of the particles of the silicon compound as shown in Table 4, and cycle characteristics and first time efficiency were evaluated. The crystallinity of Si crystallite of the particles of the silicon compound can be controlled by changing the vaporization temperature of the raw materials, or the heat treatment after formation of the particles of the silicon compound. In Example 4-8, the half value width was calculated to as 20° or more, but it is a result fitted by using an analytical software and substantially no peak is obtained. Accordingly, the silicon region in the particles of the silicon compound of Example 4-8 can be said to be substantially amorphous.

TABLE 4

SiOx x = 0.95, $D_{50}$ = 4 μm, Graphite (Natural graphite:Artificial graphite = 5:5) $D_{50}$ = 20 μm, SiOx ratio 10% by mass, $Li_2SiO_3$, $Li_4SiO_4$, Carbon material: Average thickness 100 nm, Process: Oxidation-reduction doping → Thermal method, A > B, dQ/dV: present, Peak derived from (002) face of Zabuyelite: present

|  | Half value width 2θ (°) | Si (111) crystallite size (nm) | Capacity retention rate (%) | Initial efficiency (%) |
|---|---|---|---|---|
| Example 4-1 | 0.756 | 11.42 | 79.8 | 89.0 |
| Example 4-2 | 0.796 | 10.84 | 80.1 | 88.9 |
| Example 4-3 | 1.025 | 8.55 | 80.2 | 89.1 |
| Example 4-4 | 1.218 | 7.21 | 80.1 | 89.2 |
| Example 4-5 | 1.845 | 4.62 | 80.4 | 89.3 |
| Example 1-3 | 2.257 | 3.77 | 80.4 | 89.1 |
| Example 4-6 | 2.593 | 3.29 | 80.5 | 89.2 |
| Example 4-7 | 10.123 | 1.524 | 80.5 | 89.0 |
| Example 4-8 | 20.221 | 0 | 80.7 | 88.6 |

As can be seen from Table 4, in particular, in the low crystallinity material having the half value width of 1.2° or more and the crystallite size caused by the Si (111) face size of 7.5 nm or less, high capacity retention rate was obtained. Among these, when the silicon compound was amorphous, the best characteristics were obtained.

Example 5-1

A secondary battery was produced in the same conditions as in Example 1-3 except that the relation between the maximum peak intensity value A at the Si and Li silicate region and the peak intensity value B derived from the $SiO_2$ region of the silicon compound was made A<B, and cycle characteristics and first time efficiency were evaluated. In this case, by lowering the inserting amount of the lithium at the time of reforming, the amount of $Li_2SiO_3$ was reduced, and the intensity A of the peak derived from $Li_2SiO_3$ was made small.

TABLE 5

SiOx x = 0.95, $D_{50}$ = 4 μm, Graphite (Natural graphite:Artificial graphite = 5:5) $D_{50}$ = 20 μm, SiOx ratio 10% by mass, $Li_2SiO_3$, $Li_4SiO_4$, Carbon material: Average thickness 100 nm, Si (111) half value width: 2.257°, Crystallite: 3.77 nm, Process: Oxidation-reduction doping → Thermal method, dQ/dV: present, Peak derived from (002) face of Zabuyelite: present, $I_b/I_a = 4.0 \times 10^{-2}$

|  | Relationship between intensity values of A and B | Capacity retention rate (%) | Initial efficiency (%) |
|---|---|---|---|
| Example 5-1 | A < B | 80.1 | 88.4 |
| Example 1-3 | A > B | 80.4 | 89.1 |

As can be seen from Table 5, when the relationship between peak intensities was A>B, cycle characteristics and initial charge and discharge characteristics were improved.

Example 6-1

A secondary battery was produced in the same conditions as in Example 1-3 except for using a negative electrode active material in which no peak was obtained in the range of 0.40 V to 0.55 V of V in any charging and discharging, in the V–dQ/dV curve obtained in 30 times of charging and discharging in the test cell, and cycle characteristics and initial efficiency were evaluated.

TABLE 6

SiOx x = 0.95, $D_{50}$ = 4 μm, Graphite (Natural graphite:Artificial graphite = 5:5) $D_{50}$ = 20 μm, SiOx ratio 10% by mass, $Li_2SiO_3$, $Li_4SiO_4$, Carbon material: Average thickness 100 nm, Si (111) half value width: 2.257°, Crystallite: 3.77 nm, Process: Oxidation-reduction doping → Thermal method, A > B, Peak derived from (002) face of Zabuyelite: present, $I_b/I_a$ = 4.0 × $10^{-2}$

|  | Peak of dQ/dV | Capacity retention rate (%) | Initial efficiency (%) |
|---|---|---|---|
| Example 6-1 | None | 80.0 | 88.5 |
| Example 1-3 | Present | 80.4 | 89.1 |

In order to raise the shape of the discharge curve more sharply, it is necessary to exhibit the discharge behavior similar to that of silicon (Si) in the silicon compound (SiOx). The silicon compound, which does not appear the peak in the range at 30 times of charge and discharge, becomes a relatively gentle discharge curve, and when it is made a secondary battery, it gave the result that initial charge and discharge characteristics were slightly lowered. If it was a material which appeared the peak by charge and discharge within 30 times, a stable bulk was formed, and cycle characteristics and initial charge and discharge characteristics were improved.

Examples 7-1 to 7-6

A secondary battery was produced in the same conditions as in Example 1-3 except for changing the median diameter of the particles of the negative electrode active material to those shown in Table 7, and cycle characteristics and first time efficiency were evaluated.

TABLE 7

SiOx x = 0.95, Graphite (Natural graphite:Artificial graphite = 5:5) $D_{50}$ = 20 μm, SiOx ratio 10% by mass, $Li_2SiO_3$, $Li_4SiO_4$, Carbon material: Average thickness 100 nm, Si (111) half value width: 2.257°, Crystallite: 3.77 nm, Process: Oxidation-reduction doping → Thermal method, A > B, dQ/dV: present, Peak derived from (002) face of Zabuyelite: present, $I_b/I_a$ = 4.0 × $10^{-2}$

|  | Median diameter (μm) | Capacity retention rate (%) | Initial efficiency (%) |
|---|---|---|---|
| Example 7-1 | 0.1 | 78.7 | 87.7 |
| Example 7-2 | 0.5 | 80.0 | 88.1 |
| Example 7-3 | 1 | 80.3 | 88.8 |
| Example 1-3 | 4 | 80.4 | 89.1 |
| Example 7-4 | 10 | 80.3 | 89.2 |
| Example 7-5 | 15 | 80.3 | 89.2 |
| Example 7-6 | 20 | 80.1 | 89.0 |

As can be seen from Table 7, when the median diameter of the particles of the negative electrode active material is 1.0 μm or more, cycle characteristics were improved. This is considered to be because the surface area per mass of the silicon compound was not too large, and the area where side reaction occurred could be made small. On the other hand, when the median diameter is 15 μm or less, cycle characteristics were improved. This is considered by the reason that the particles are difficultly cracked during charging, and SEI (solid electrolyte interface) due to the newly generated surface is difficultly generated at the time of charging and discharging, so that loss of reversible Li can be suppressed. Further, when the median diameter of the particles of the silicon-based active material is 15 μm or less, it can be considered that the amount of expansion of the particles of the silicon compound during charging does not become large, so that physical and electrical breakdown of the layer of the negative electrode active material due to expansion can be prevented.

Examples 8-1 to 8-4

A secondary battery was produced in the same conditions as in Example 1-3 except for changing the average thickness of the carbon material coated on the surface of the particles of the silicon-based active material, and cycle characteristics and first time efficiency were evaluated. The average thickness of the carbon material can be adjusted by changing the CVD conditions.

TABLE 8

SiOx x = 0.95 $D_{50}$ = 4 μm, Graphite (Natural graphite:Artificial graphite = 5:5) $D_{50}$ = 20 μm, SiOx ratio 10% by mass, $Li_2SiO_3$, $Li_4SiO_4$, Carbon material: present, Si (111) half value width: 2.257°, Crystallite: 3.77 nm, Process: Oxidation-reduction doping → Thermal method, A > B, dQ/dV: present, Peak derived from (002) face of Zabuyelite: present, $I_b/I_a$ = 4.0 × $10^{-2}$

|  | Average thickness (μm) | Capacity retention rate (%) | Initial efficiency (%) |
|---|---|---|---|
| Example 8-1 | 5 | 78.7 | 88.2 |
| Example 8-2 | 10 | 80.0 | 88.5 |
| Example 1-3 | 100 | 80.4 | 89.1 |
| Example 8-3 | 1,000 | 80.6 | 88.8 |
| Example 8-4 | 5,000 | 80.5 | 88.7 |

As can be seen from Table 8, since the conductivity is particularly improved when the thickness of the carbon layer is 10 nm or more, cycle characteristics and initial charge and discharge characteristics can be improved. On the other hand, if the thickness of the carbon layer is 5,000 nm or less, the amount of the particles of the silicon compound can be sufficiently secured from the design of the battery, so that battery capacity can be sufficiently secured.

Example 9-1

A secondary battery was produced in the same conditions as in Example 1-3 except for changing the reforming method to the thermal doping method as shown in Table 9, and cycle characteristics and initial efficiency were evaluated. In Example 9-1, first, particles of the silicon compound were produced, and formation of the carbon film was carried out in the same manner as in Example 1-3. Thereafter, lithium was inserted into the carbon-coated particles of the silicon compound by the thermal doping method using LiH powder. Then, lithium carbonate was mixed and again subjected to heat treatment in Ar at 800° C. so that a peak of 2θ=31.8±0.5° was made to appear.

Example 9-2

As shown in Table 9, the reforming method was changed to an electrochemical method, and after bulk reforming, the materials were subjected to heat treatment in Ar at 800° C. so that a peak of 2θ=31.8±0.5° was made to appear.

TABLE 9

SiOx x = 0.95 D$_{50}$ = 4 μm, Graphite (Natural graphite:Artificial graphite = 5:5) D$_{50}$ = 20 μm, SiOx ratio 10% by mass, Li$_2$SiO$_3$, Li$_4$SiO$_4$, Carbon material: Average thickness 100 nm, A > B, dQ/dV: present, Peak derived from (002) face of Zabuyelite: present

|  | Li inserting method | Capacity retention rate (%) | Initial efficiency (%) |
|---|---|---|---|
| Example 9-1 | Thermal doping | 77.6 | 88.2 |
| Example 9-2 | Electro-chemical | 80.4 | 89.1 |
| Example 1-3 | Oxidation-reduction | 80.4 | 89.1 |

Even when the thermal doping method or oxidation-reduction method was used, good battery characteristics were obtained. In addition, when the thermal doping method was used, crystallinity of the particles of the silicon compound also changed by heating. With any of the reforming method in Table 9, a sufficient capacity retention rate and initial efficiency were obtained.

Example 10-1

A secondary battery was produced in the same conditions as in Example 1-3 except for changing the phase of lithium carbonate contained in the particles of the negative electrode active material, and cycle characteristics and first time efficiency were evaluated. The phase of the lithium carbonate was adjusted by mixing the lithium carbonate with the particles of the negative electrode active material (particles of the silicon-based active material), and then, heating the mixture. In Table 10, the lithium carbonate contained in Example 10-1 was designated to as "amorphous". The "amorphous" referred to in Example 10-1 means that the presence of Li$_2$CO$_3$ can be confirmed by anion chromatography, XPS or the like, and a peak appears broadly in the range of 31.8±0.5° in the XRD spectrum (for example, in the case of the crystal size of 2 nm or less by the Debye Scherrer's equation).

TABLE 10

SiOx x = 0.95 D$_{50}$ = 4 μm, Graphite (Natural graphite:Artificial graphite = 5:5) D$_{50}$ = 20 μm, SiOx ratio 10% by mass, Li$_2$SiO$_3$, Li$_4$SiO$_4$, Carbon material: Average thickness 100 nm, Process: Oxidation-reduction doping → Thermal method, A > B, dQ/dV: present, Peak derived from (002) face of Zabuyelite: present

|  | Phase of lithium carbonate | Capacity retention rate (%) | Initial efficiency (%) |
|---|---|---|---|
| Example 10-1 | Amorphous | 78.8 | 87.6 |
| Example 1-3 | Zabuyelite | 80.4 | 89.1 |

As can be seen from Table 10, by the phase of lithium carbonate being Zabuyelite, cycle characteristics and initial charge and discharge characteristics can be improved.

It must be stated here that the present invention is not restricted to the embodiments shown by Examples. The embodiments shown by Examples are merely examples so that any embodiments composed of substantially the same technical concept as disclosed in the claims of the present invention and expressing a similar effect are included in the technical scope of the present invention.

The invention claimed is:

1. A negative electrode active material which is a negative electrode active material containing particles of a negative electrode active material, wherein
    the particles of the negative electrode active material contain particles of a silicon compound which contain a silicon compound (SiO$_x$:0.5≤x≤1.6),
    the particles of the negative electrode active material contain lithium, and
    the particles of the negative electrode active material have a peak in the range of 2θ=31.8±0.5° obtained by X-ray diffraction spectrum using Kα line of Cu.

2. The negative electrode active material according to claim 1, wherein the particles of the negative electrode active material are a material, in the X-ray diffraction spectrum using Kα line of Cu, in which an intensity $I_a$ of a peak deriving from an Si (111) face appeared in a range of 2θ=28.2±0.5° and an intensity $I_b$ of a peak appeared in a range of 2θ=31.8±0.5° satisfy a relationship of the following formula 1:

$$1.0 \times 10^{-3} < I_b/I_a < 1.0 \times 10^0. \quad \text{Formula 1)}$$

3. The negative electrode active material according to claim 1, wherein the peak appeared in the range of 2θ=31.8±0.5° of the X-ray diffraction spectrum using Kα line of Cu is a peak deriving from a (002) face of Zabuyelite which is a crystal phase of lithium carbonate.

4. The negative electrode active material according to claim 2, wherein the peak appeared in the range of 2θ=31.8±0.5° of the X-ray diffraction spectrum using Kα line of Cu is a peak deriving from a (002) face of Zabuyelite which is a crystal phase of lithium carbonate.

5. The negative electrode active material according to claim 1, wherein the particles of the negative electrode active material contain one or more kinds of a polyphenylene compound and a polycyclic aromatic compound,
    the polyphenylene compound is one or more kinds of biphenyl, terphenyl, and a derivative thereof, and the polycyclic aromatic compound is one or more kinds of naphthalene, anthracene, phenanthrene, naphthacene, pentacene, pyrene, picene, coronene, chrysene, and a derivative thereof.

6. The negative electrode active material according to claim 2, wherein the particles of the negative electrode active material contain one or more kinds of a polyphenylene compound and a polycyclic aromatic compound,
    the polyphenylene compound is one or more kinds of biphenyl, terphenyl, and a derivative thereof, and the polycyclic aromatic compound is one or more kinds of naphthalene, anthracene, phenanthrene, naphthacene, pentacene, pyrene, picene, coronene, chrysene, and a derivative thereof.

7. The negative electrode active material according to claim 3, wherein the particles of the negative electrode active material contain one or more kinds of a polyphenylene compound and a polycyclic aromatic compound,
    the polyphenylene compound is one or more kinds of biphenyl, terphenyl, and a derivative thereof, and the polycyclic aromatic compound is one or more kinds of naphthalene, anthracene, phenanthrene, naphthacene, pentacene, pyrene, picene, coronene, chrysene, and a derivative thereof.

8. The negative electrode active material according to claim 4, wherein the particles of the negative electrode active material contain one or more kinds of a polyphenylene compound and a polycyclic aromatic compound,
    the polyphenylene compound is one or more kinds of biphenyl, terphenyl, and a derivative thereof, and the polycyclic aromatic compound is one or more kinds of naphthalene, anthracene, phenanthrene, naphthacene, pentacene, pyrene, picene, coronene, chrysene, and a derivative thereof.

9. The negative electrode active material according to claim 1, wherein the particles of the silicon compound contain one or more kinds of $Li_2SiO_3$ and $Li_4SiO_4$.

10. The negative electrode active material according to claim 1, wherein the particles of the silicon compound have a half value width (2θ) of a diffraction peak attributable to an Si (111) crystal face obtained by X-ray diffraction of 1.2° or more and have a crystallite size corresponding to the crystal face of 7.5 nm or less.

11. The negative electrode active material according to claim 1, wherein, in the particles of the silicon compound, a maximum peak intensity value A of Si and Li silicate region given by −60 to −95 ppm as a chemical shift value, and a peak intensity value B of an $SiO_2$ region given by −96 to −150 ppm as a chemical shift value each obtained from $^{29}Si$-MAS-NMR spectrum satisfy a relation A>B.

12. The negative electrode active material according to claim 1, wherein a test cell comprising a negative electrode which contains a mixture of a negative electrode active material and a carbon-based active material and a counter electrode lithium is produced, and in the test cell, charging and discharging comprising charging which is to flow an electric current so that lithium is inserted into the negative electrode active material and discharging which is to flow an electric current so that lithium is released from the negative electrode active material are repeated 30 times, when a graph showing a relationship between a differentiated value dQ/dV in which a discharge capacity Q at each charge and discharge is differentiated by a potential V of the negative electrode based on the counter electrode lithium, and the potential V, then, a peak of the potential V of the negative electrode at the time of discharging after the Xth time (1≤X≤30) is in the range of 0.40 V to 0.55 V.

13. The negative electrode active material according to claim 1, wherein the particles of the negative electrode active material have a median diameter of 1.0 μm or more and 15 μm or less.

14. The negative electrode active material according to claim 1, wherein the particles of the negative electrode active material contain a carbon material at a surface layer portion.

15. The negative electrode active material according to claim 14, wherein an average thickness of the carbon material is 10 nm or more and 5,000 nm or less.

16. A mixed negative electrode active material which comprises the negative electrode active material according to claim 1 and a carbon-based active material.

17. A method for producing a negative electrode active material which is a method for producing a negative electrode active material containing particles of the negative electrode active material which contain particles of a silicon compound, which comprises producing the particles of the negative electrode active material by
    producing particles of a silicon compound which contain a silicon compound ($SiO_x$:0.5≤x≤1.6) and
    inserting lithium into the particles of the silicon compound, and
    selecting particles having a peak in a range of 2θ=31.8±0.5° obtained by X-ray diffraction spectrum using Kα line of Cu from the produced particles of the negative electrode active material, and
    producing a negative electrode active material by using the selected particles of the negative electrode active material.

* * * * *